(12) United States Patent
Zhang et al.

(10) Patent No.: US 12,063,119 B2
(45) Date of Patent: Aug. 13, 2024

(54) METHOD AND APPARATUS FOR PHYSICAL DOWNLINK SHARED CHANNEL (PDSCH) HYBRID AUTOMATIC REPEAT REQUEST (HARQ)-ACKNOWLEDGEMENT (ACK) FEEDBACK IN WIRELESS COMMUNICATION

(71) Applicant: Apple Inc., Cupertino, CA (US)

(72) Inventors: Yushu Zhang, Beijing (CN); Hong He, Cupertino, CA (US); Dawei Zhang, Cupertino, CA (US); Haitong Sun, Cupertino, CA (US); Jie Cui, Cupertino, CA (US); Manasa Raghavan, Cupertino, CA (US); Wei Zeng, Cupertino, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,351

(22) PCT Filed: Aug. 7, 2020

(86) PCT No.: PCT/CN2020/107831
§ 371 (c)(1),
(2) Date: Sep. 21, 2021

(87) PCT Pub. No.: WO2022/027597
PCT Pub. Date: Feb. 10, 2022

(65) Prior Publication Data
US 2023/0179342 A1 Jun. 8, 2023

(51) Int. Cl.
*H04L 1/1829* (2023.01)
*H04W 72/232* (2023.01)
(52) U.S. Cl.
CPC ......... *H04L 1/1854* (2013.01); *H04W 72/232* (2023.01)

(58) Field of Classification Search
CPC ... H04L 1/1854; H04L 1/1664; H04L 5/0055; H04L 1/1812; H04L 1/1685; H04L 1/1822; H04L 1/1864; H04W 72/232
See application file for complete search history.

(56) References Cited

U.S. PATENT DOCUMENTS 6,286,104 B1 * 9/2001 Buhle ................ H04L 63/105
707/999.009
2019/0363840 A1 11/2019 Wang et al.
(Continued)

FOREIGN PATENT DOCUMENTS

| WO | 2020143656 A1 | 7/2020 |
| WO | 2021/163330 A1 | 8/2021 |

OTHER PUBLICATIONS

International Preliminary Report on Patentability dated Feb. 7, 2023 in connection with Application Serial No. PCT/CN2020/107831.
(Continued)

*Primary Examiner* — Brian T O Connor
(74) *Attorney, Agent, or Firm* — Eschweiler & Potashnik, LLP

(57) ABSTRACT

A user equipment (UE) associated with a wireless communication system is disclosed. The UE comprises a processor configured to receive a first downlink control information (DCI) for scheduling a first physical downlink shared channel (PDSCH). The first DCI includes a non-numerical (NN) value of K1 for hybrid automatic repeat request (HARQ)-ACK feedback. The processor is further configured to determine a first priority class associated with the first PDSCH, and determine K1 value and priority class associated with one or more subsequent PDSCH received from the BS, until a selected PDSCH having a numerical K1 value and a same priority class as the first priority class is identified. Further, the processor is configured to provide HARQ-ACK feed-
(Continued)

back associated with the first PDSCH using a PUCCH/PUSCH occasion indicated by a second DCI scheduling the selected PDSCH.

20 Claims, 10 Drawing Sheets

(56) References Cited

U.S. PATENT DOCUMENTS

| | | | |
|---|---|---|---|
| 2023/0043308 A1* | 2/2023 | Li | H04L 5/0055 |
| 2023/0091988 A1* | 3/2023 | Li | H04L 1/1685 |
| | | | 370/329 |
| 2023/0164764 A1* | 5/2023 | Chen | H04W 72/11 |
| | | | 370/329 |
| 2023/0261840 A1* | 8/2023 | Wong | H04L 1/1812 |
| | | | 370/329 |
| 2023/0336314 A1* | 10/2023 | Wong | H04L 1/1896 |

OTHER PUBLICATIONS

5G; NR; Multiplexing and channel coding; (3GPP TS 38.212 version 15.9.0 Release 15); ETSI TS 138 212 V15.9.0; Jul. 2020.
5G; NR; Physical layer procedures for control; (3GPP TS 38.213 version 15.10.0 Release 15); ETSI TS 138 213 V15.10.0; Jul. 2020.
5G; NR; Radio Resource Control (RRC); Protocol specification; (3GPP TS 38.331 version 15.10.0 Release 15); ETSI TS 138 331 V15.10.0; Jul. 2020.
International Search Report Dated Apr. 29, 2021 for International Application PCT/CN2020/107831.
International Written Opinion Dated Apr. 29, 2021 for International Application PCT/CN2020/107831.
"LTE Basic Procedure"; https://www.sharetechnote.com/html/BasicProcedure_LTE_HARQ.html; Aug. 6, 2020.
3GPP; "5G; NR; Multiplexing and Channel Coding"; 3GPP TS 38.212 Version 16.2.0 (Release 16); ETSI TS 138 212 V16.2.0; Jul. 2020.
3GPP; "5G; NR; Physical Layer Procedures for Control"; 3GPP TS 38.213 Version 16.2.0 (Release 16); ETSI TS 138 213 V16.2.0; Jul. 2020.
3GPP; "5G; NR; Radio Resource Control (RRC); Protocol Specification"; 3GPP TS 38.331 Version 16.1.0 (Release 16); ETSI TS 138 331 V16.1.0; Jul. 2020.
Adlen Ksentini, et al.; "Providing Low Latency Guarantees for Slicing-Ready 5G Systems Via Two-Level MAC Scheduling"; Apr. 24, 2018.
3GPP; "3rd Generation Partnership Project; Technical Specification Group Radio Access Network; NR; Physical Layer Procedures for Control (Release 16)"; 3GPP TS 38.213; V16.1.0; Mar. 2020.
Xiao Wen Li, et al.; "Research and Solution of Semi-Persistent Scheduling Problem in LTE System"; 2011 International Conference on Computer Science and Information Technology (ICCSIT 2011); IPCSIT vol. 51 (2021).
Libby Allen; "It's A Big Aspect of 5G but What is URLLC?"; https://www.rcrwireless.com/20190107/5g/what-is-urllc; Jan. 7, 2019.
"Hybrid Automatic Repeat Request (HARQ) in LTE FDD"; Techplayon; https://www.techplayon.com/hybrid-automatic-repeat-request-harq-in-lte-fdd/; Oct. 18, 2018.
Qualcomm Incorporated; "Enhancements to Scheduling and HARQ Operation for NR-U"; 3GPP TSG RAN WG1; Meeting #98bis; R1-1911099; Oct. 20, 2019.
"Moderator (Hua Wei) Feature Lead Summary #1 on 101-e-NR-unlic-NRU-HARQ-03 (NNK1 value)"; 3GPP TSG RAN WG1 Meeting #101-e; R1-2004746; Jun. 5, 2020.
Qualcomm; Summary for [100b-e-NR-L1enh-URLLC-Scheduling and HARQ-02]; 3GPP TSG RAN WG1; Meeting #100b eMeeting; R1-2003060; Apr. 30, 2020.
European Extended Search Report dated Mar. 21, 2024, for EP Application No. 20948681.
Huawei: "Feature lead summary #2 of HARQ enhancements for NR-U"; 3GPP Draft; RI-1911618; vol. RAN WG1; Oct. 22, 2019.
Notice of Allowance dated Apr. 8, 2024 in connection with U.S. Appl. No. 17/441,351.

* cited by examiner

METHOD AND APPARATUS FOR PHYSICAL DOWNLINK SHARED CHANNEL (PDSCH) HYBRID AUTOMATIC REPEAT REQUEST (HARQ)-ACKNOWLEDGEMENT (ACK) FEEDBACK IN WIRELESS COMMUNICATION

REFERENCE TO RELATED APPLICATIONS

This application is a National Phase entry application of International Patent Application No. PCT/CN2020/107831 filed Aug. 7, 2020, entitled "METHOD AND APPARATUS FOR PHYSICAL DOWNLINK SHARED CHANNEL (PDSCH) HYBRID AUTOMATIC REPEAT REQUEST (HARQ)-ACKNOWLEDGEMENT (ACK) FEEDBACK IN WIRELESS COMMUNICATION", the contents of which are herein incorporated by reference in their entirety.

FIELD

The present disclosure relates to the field of wireless communication systems, and in particular, to a system and method for physical downlink shared channel (PDSCH) hybrid automatic repeat request (HARQ)-acknowledgement (ACK) feedback in wireless communication.

BACKGROUND

Networks need to provide data quickly and reliably without taxing their resources. Hybrid automatic repeat request (HARQ) technology can make that happen. HARQ uses a stop and wait protocol. When a transmission has been made, the transmitting entity stops and waits until it receives an acknowledgement (ACK) or negative acknowledgement (NACK) back from the destination before transmitting the next block of data or retransmitting the same data block. Such transmission/reception processes that relies on ACK/NACK feedback are sometimes referred to as HARQ processes.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1A:
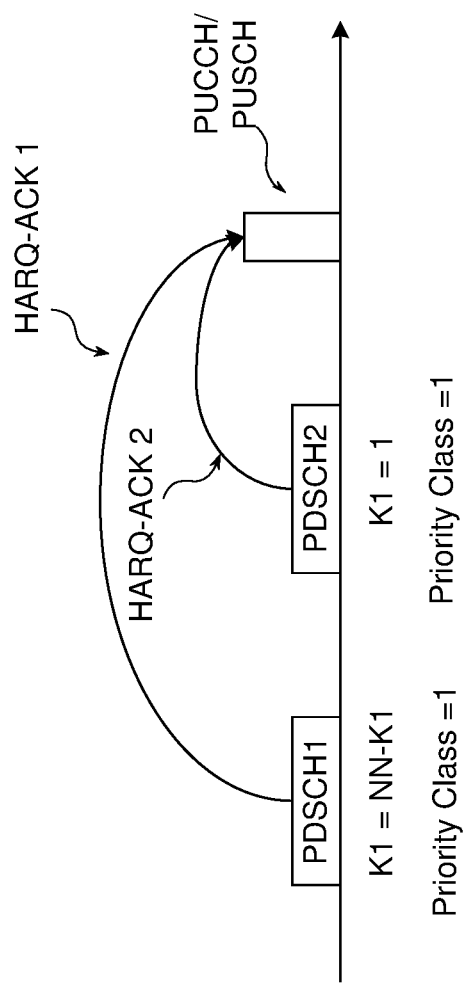
FIG. 1a and FIG. 1b illustrates HARQ-ACK feedback timing determination in legacy systems when two HARQ-ACK codebooks with different priority classes are configured for a UE.

In one embodiment of the disclosure, a user equipment (UE) associated with a wireless communication system is disclosed. The UE comprises a processor configured to process a first downlink control information (DCI) for scheduling a first physical downlink shared channel (PDSCH), received from a base station (BS) associated therewith. In some embodiments, the first DCI includes a non-numerical (NN) value of K1 for hybrid automatic repeat request (HARQ)-ACK feedback. In some embodiments, K1 indicates a time delay between a corresponding PDSCH and a HARQ-ACK feedback associated therewith. The processor is further configured to process the first PDSCH received from the BS and determine a first priority class associated with the first PDSCH. Further, the processor is configured to determine K1 value and priority class associated with one or more subsequent PDSCH received from the BS, until a selected PDSCH having a numerical K1 value and a same priority class as the first priority class is identified. Furthermore, the processor is further configured to provide HARQ-ACK feedback associated with the first PDSCH using a physical uplink control channel (PUCCH) occasion or a physical uplink shared channel (PUSCH) occasion indicated by a second DCI scheduling the selected PDSCH with the same priority class.

In one embodiment of the disclosure, a base station associated with a wireless communication system is disclosed. The base station comprises a processor configured to provide a first downlink control information (DCI) for scheduling a first physical downlink shared channel (PDSCH) having a first priority class associated therewith, to a user equipment (UE) associated therewith. In some embodiments, the first DCI includes a non-numerical (NN) value of K1 for hybrid automatic repeat request (HARQ)-ACK feedback. In some embodiments, K1 indicates a time delay between a corresponding PDSCH and a HARQ-ACK feedback associated therewith. The processor is further configured to provide the first PDSCH to the UE. Furthermore, the processor is configured to provide one or more subsequent PDSCHs to the UE. In some embodiments, a select PDSCH of the one or more subsequent PDSCHs comprises a numerical K1 value for HARQ-ACK feedback and a same priority class as the first priority class associated with the first PDSCH. In addition, the processor is configured to process a HARQ-ACK feedback associated with the first PDSCH, received from the UE, wherein the HARQ-ACK feedback associated with the first PDSCH is received on a physical uplink control channel (PUCCH) occasion or a physical uplink shared channel (PUSCH) occasion indicated by a second DCI scheduling the select PDSCH with the same priority class.

In one embodiment of the disclosure, a method for a user equipment (UE) associated with a wireless communication system is disclosed. The method comprises processing a first downlink control information (DCI) for scheduling a first physical downlink shared channel (PDSCH), received from a base station (BS) associated therewith, using one or more processors. In some embodiments, the first DCI includes a non-numerical (NN) value of K1 for hybrid automatic repeat request (HARQ)-ACK feedback. In some embodiments, K1 indicates a time delay between a corresponding PDSCH and a HARQ-ACK feedback associated therewith. The method further comprises processing the first PDSCH received from the BS, using the one or more processors and determining a first priority class associated with the first PDSCH, using the one or more processors. Furthermore, the method comprises determining K1 value and priority class associated with one or more subsequent PDSCH received from the BS, using the one or more processors, until a selected PDSCH having a numerical K1 value and a same priority class as the first priority class is identified. In addition, the method comprises providing HARQ-ACK feedback associated with the first PDSCH, from the one or more processors, using a physical uplink control channel (PUCCH) occasion or a physical uplink shared channel (PUSCH) occasion indicated by a DCI scheduling the selected PDSCH with the same priority class.

In one embodiment of the disclosure, a method for a base station (BS) associated with a wireless communication system is disclosed. The method comprises providing a first downlink control information (DCI) for scheduling a first physical downlink shared channel (PDSCH) having a first priority class associated therewith, to a user equipment (UE) associated therewith, using one or more processors. In some embodiments, the first DCI includes a non-numerical (NN) value of K1 for hybrid automatic repeat request (HARQ)-ACK feedback. In some embodiments, K1 indicates a time delay between a corresponding PDSCH and a HARQ-ACK feedback associated therewith. The method further comprises providing the first PDSCH to the UE, using the one or more processors. Furthermore, the method comprises providing one or more subsequent PDSCHs to the UE, using the one or more processors. In some embodiments, a select PDSCH of the one or more subsequent PDSCHs comprises a numerical K1 value for HARQ-ACK feedback and a same priority class as the first priority class associated with the first PDSCH. In addition, the method comprises processing a HARQ-ACK feedback associated with the first PDSCH, received from the UE, using the one or more processors. In some embodiments, the HARQ-ACK feedback associated with the first PDSCH is received on a physical uplink control channel (PUCCH) occasion or a physical uplink shared channel (PUSCH) occasion indicated by a DCI scheduling the select PDSCH with the same priority class.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As indicated above, HARQ process relies upon receiving ACK/NACK for the data packets. When a base station (BS) sends data to a user equipment (UE) through physical downlink shared channel (PDSCH), the UE determines it's correctness by checking cyclic redundancy check (CRC) and report it to base station through ACK/NACK bit. If the UE also has data to send and it gets a grant, it'll send ACK/NACK on physical uplink shared channel (PUSCH) along with data, otherwise it'll send it on physical uplink control channel (PUCCH). A HARQ-ACK codebook defines the format used to signal a set of HARQ acknowledgements (ACKs) to the base station. The HARQ-ACK codebook allows the UE to multiplex the HARQ ACKs from multiple slots, multiple carriers, multiple transport blocks and multiple code block groups (CBGs) within a single transmission. It is important that both UE and base station share the same understanding of the codebook format to ensure that each acknowledgement is linked to the appropriate transmission. The base station configures the use of a specific codebook category using the pdsch-HARQ-ACK-Codebook information element in a downlink control information (DCI) scheduling the PDSCH. Different categories of HARQ-ACK codebooks are defined in 3GPP. For example, a Type-1 HARQ-ACK codebook comprising a semi-static codebook where the size of the codebook is fixed by information provided by radio resource control (RRC) signaling and a Type-2 HARQ-ACK codebook comprising a dynamic codebook where the size of the codebook changes according to the number of resource allocations. Further, a Type-3 HARQ-ACK codebook is defined that is triggered on demand by a one-shot HARQ-ACK frequent field in the DCI.

3GPP supports up to two HARQ-ACK codebooks for a UE. Specifically, the UE may be indicated by pdsch-HARQ-ACK-Codebook-List to generate one or two HARQ-ACK codebooks. If the UE is indicated to generate two HARQ-ACK codebooks, a first HARQ-ACK codebook is associated with a PUCCH of priority index 0 (e.g., a higher priority and a second HARQ-ACK codebook is associated with a PUCCH of priority index 1 (e.g., a lower priority). As indicated above, the HARQ-ACK feedback associated with a PDSCH transmission is provided to the UE using a PUCCH or PUSCH occasion. In some embodiments, the terms HARQ-ACK feedback and HARQ-ACK codebook refers to a same entity. A DCI scheduling the PDSCH comprises a PDSCH-to-HARQ_feedback timing indicator field that informs the UE about the timing of HARQ ACK feedback (in slots) relative to PDSCH reception. If the UE detects a DCI scheduling a PDSCH reception ending in slot n, the UE provides corresponding HARQ-ACK information in a PUCCH/PUSCH transmission within slot n+k, where k is a number of slots as indicated by the PDSCH-to-HARQ_feedback timing indicator field. For example, a K1 value is provided in the PDSCH-to-HARQ_feedback timing indicator field. Unless stated otherwise, the PDSCH-to-HARQ_feedback timing indicator field provides an applicable value (e.g., a numerical value).

Figure 1B:
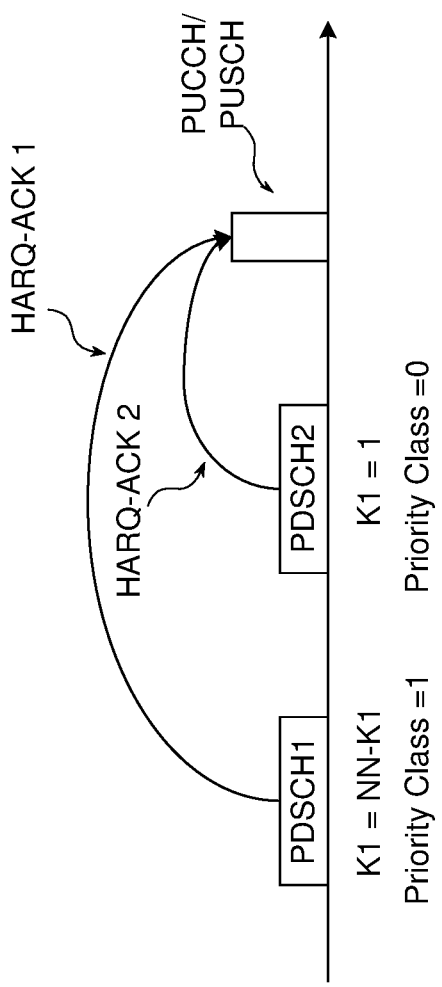

However, in cases where the UE is configured with Type-2/Enhanced Type-2 HARQ-ACK codebooks, in some embodiments, a DCI scheduling a PDSCH may provide a PDSCH-to-HARQ_feedback timing indicator field that includes an inapplicable value, for example a non-numerical (NN)-K1 value for HARQ-ACK feedback. Therefore, in such embodiments, the UE is unable to identify a PUCCH/PUSCH occasion for HARQ-ACK feedback. In such embodiments, in the current implementations, the UE is configured to hold on to the HARQ-ACK feedback information associated with the PDSCH (with the NN-K1 value for the HARQ-ACK feedback), and the UE multiplexes the corresponding HARQ-ACK feedback information in a PUCCH or PUSCH transmission in a slot that is indicated by a K1 value (i.e., numerical value or applicable value) of a PDSCH-to-HARQ_feedback timing indicator field in a subsequent DCI format that schedules the subsequent PDSCH, as shown in FIG. 1a and FIG. 1b. Specifically, in FIG. 1a and FIG. 1b, the HARQ-ACK1 associated with PDSCH1 with a non-numerical value of K1 (i.e., NN-K1) is multiplexed with the HARQ-ACK2 associated with the PDSCH2 with a numerical value of K1.

In some embodiments, the PDSCH1 associated with HARQ-ACK1 and the PDSCH2 associated with HARQ-ACK2 are associated with the same priority class, that is, priority class 1, as shown in FIG. 1a. Alternately, in other embodiments, the PDSCH1 associated with HARQ-ACK1 and the PDSCH2 associated with HARQ-ACK2 may be associated with different priority class, as shown in FIG. 1b. In the embodiments where the PDSCH1 and the PDSCH2 has different priority class, utilizing the same PUCCH/PUSCH to transmit HARQ-ACK feedback associated with both PDSCH1 and PDSCH2 might affect the reliability requirements of the PDSCH with higher priority class. For example, in the case of FIG. 1b, the PDSCH2 with priority class 0 (i.e., higher priority class) may be utilized to carry ultra-reliable low latency communications (URLLC) and the PDSCH1 with priority class 1 (i.e., lower priority class) may be utilized to carry enhance mobile broadband (eMBB) traffic. Therefore, in such embodiments, utilizing the same PUCCH/PUSCH resource for transmitting the HARQ-ACK feedback associated with both URLLC and eMBB might affect the reliability requirements associated with URLLC. In order to overcome the above disadvantage, disclosed herein are systems, circuitries, and techniques for allowing the UE to multiplex HARQ-ACK feedbacks of PDSCH with the same priority class on a PUCCH/PUSCH occasion, when two HARQ-ACK codebooks with different priority class are configured for the UE and when the UE receives a DCI with a non-numerical (NN)-K1 value for HARQ-ACK feedback.

Figure 2A:
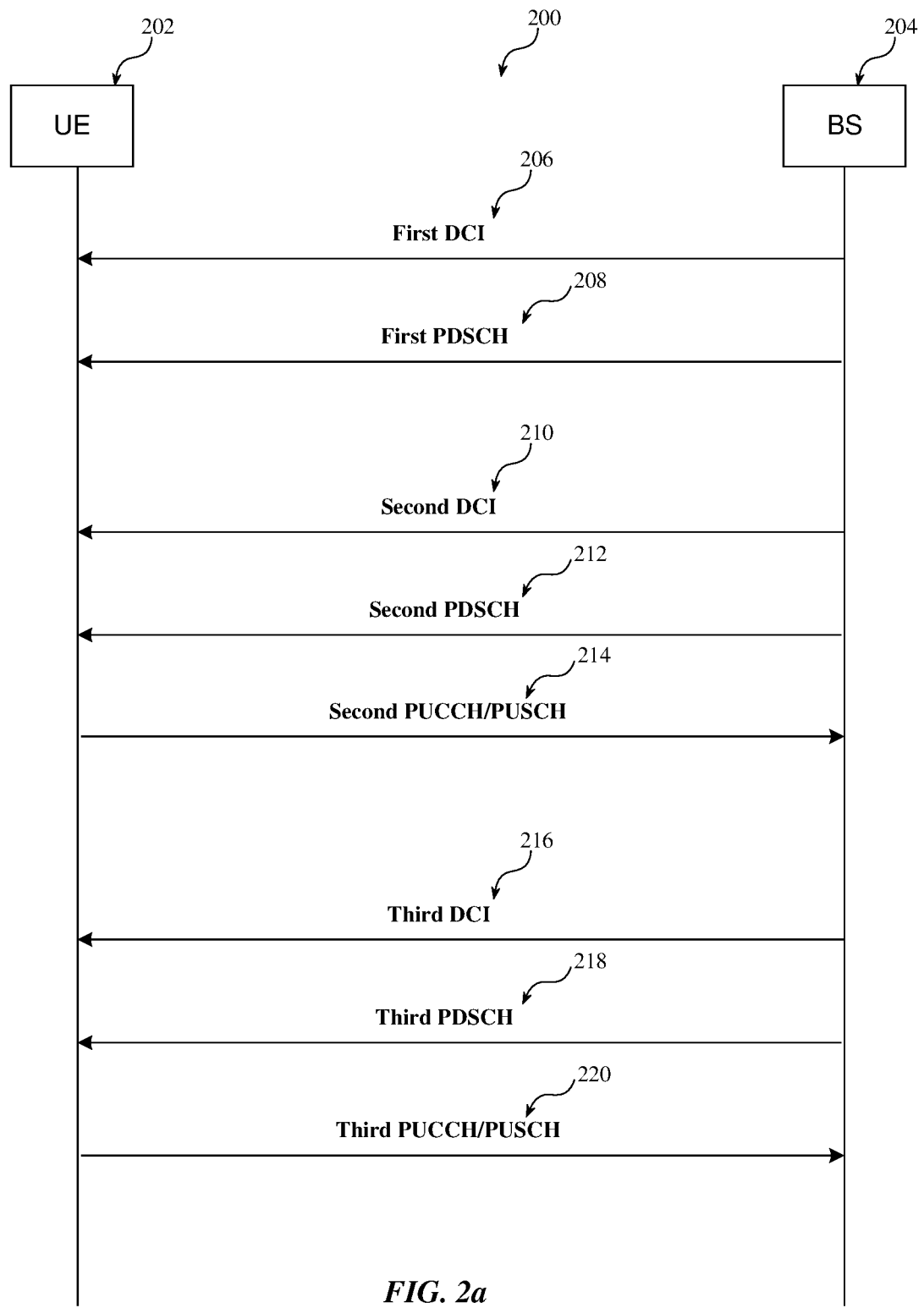
FIG. 2a illustrates a simplified block diagram of a wireless communication system, according to one embodiment of the disclosure.

FIG. 2a illustrates a simplified block diagram of a wireless communication system 200, according to one embodiment of the disclosure. The wireless communication system 200 comprises a user equipment (UE) 202 and a base station (BS) 204. In other embodiments, however, the wireless communication system 200 can comprise a plurality of UEs and is not shown here for clarity purposes. In some embodiments, base station 204 is equivalent to an eNodeB in LTE systems, gNodeB in 5G new radio (NR) systems etc. In some embodiments, the UE 202 may comprise a mobile phone, tablet computer, an internet of things (IoT) device, a vehicle-to-everything (V2X) UE, etc. The UE 202 and the base station 204 are configured to communicate with one another over a communication medium (e.g., air). In some embodiments, the wireless communication system 200 allows the UE 202 to multiplex HARQ-ACK feedbacks of PDSCH with the same priority class on a physical uplink control channel (PUCCH)/physical uplink shared channel (PUSCH), when two HARQ-ACK codebooks with different priority class are configured for the UE and when the UE receives a DCI with a non-numerical (NN)-K1 value for HARQ-ACK feedback, as can be fully appreciated below.

In some embodiments, the BS 204 is configured to generate a first downlink control information (DCI) 206 for scheduling a first physical downlink shared channel (PDSCH) 208. In some embodiments, the first DCI 206 includes a non-numerical (NN) value of K1 for hybrid automatic repeat request (HARQ)-ACK feedback. In some embodiments, K1 indicates a time delay between the first PDSCH and a corresponding HARQ-ACK feedback. In some embodiments, the NN-K1 may correspond to any inapplicable value of K1. In some embodiments, the NN-K1 value is included in a PDSCH-to-HARQ_feedback timing indicator field within the first DCI 206. Upon generating the first DCI 206, the BS 204 is configured to provide the first DCI 206 to the UE 202. Upon providing the first DCI 206, the BS 204 is further configured to provide the first PDSCH 208. The UE 202 is configured to receive the first DCI 206 from the BS 204 and process the first DCI 206. Upon processing the first DCI 206, the UE 202 is configured to determine the NN-K1 value for HARQ-ACK feedback.

The UE 202 is further configured to receive the first PDSCH 208 from the BS 204 and process the first PDSCH 208. Upon processing the first PDSCH 208, the UE 202 is configured to generate a HARQ-ACK feedback information for the first PDSCH 206. Further, the UE 202 is configured to determine a first priority class/priority associated with the first PDSCH 208. In some embodiments, the first priority class associated with the first PDSCH 208 is indicated to the UE 202 as part of the first DCI 206. Alternately, in other embodiments, the first priority class associated with the first PDSCH 206 is preconfigured and provided to the UE 202 via radio resource control (RRC) signaling from the BS 204.

Since the K1 value associated with the first DCI 206 comprises a NN-K1, the UE 202 is configured to hold on to the HARQ-ACK feedback information associated with the first PDSCH 208, and provide the HARQ-ACK feedback information associated with the first PDSCH 208 on a PUCCH/PUSCH occasion associated with a subsequent PDSCH. Specifically, the UE 202 is configured to provide the HARQ-ACK feedback information on a PUCCH/PUSCH occasion associated with a subsequent PDSCH having a numerical K1 value for HARQ-ACK feedback and a same priority class as the first priority class. In such embodiments, the UE 202 is configured to determine K1 value and priority class associated with one or more subsequent PDSCHs (for example, a second PDSCH 212 or a third PDSCH 218) received from the BS, until a selected PDSCH having a numerical K1 value and a same priority class as the first priority class is identified. Upon identifying the selected PDSCH, the UE 202 is configured to provide HARQ-ACK feedback associated with the first PDSCH 208 using a PUCCH occasion/PUSCH occasion indicated by a DCI scheduling the selected PDSCH with the same priority class, as is explained in detail below.

Referring back to FIG. 2a, the BS 204 is further configured to provide the second DCI 210 to the UE 202 for scheduling a second PDSCH 212. Further, the BS 204 is configured to provide the second PDSCH 212 to the UE 202. In some embodiments, the second DCI 210 and the second PDSCH 212 are provided to the UE 202 from the BS 204, subsequently or after the first DCI 206 and the first PDSCH 208 is provided to the UE 202 from the BS 204. The UE 202 is configured to receive and process the second DCI 210 and the second PDSCH 212. Upon processing the second DCI 210, the UE 202 is configured to determine whether a numerical K1 value or NN-K1 value is included in a PDSCH-to-HARQ_feedback timing indicator field within the second DCI 210. Further, the UE 202 is configured to generate a second HARQ-ACK feedback information associated with the second PDSCH 212. In addition, the UE 202 is configured to determine a priority class associated with the second PDSCH 212. In some embodiments, the priority class associated with the second PDSCH 212 is indicated to the UE 202 as part of the second DCI 210. Alternately, in other embodiments, the priority class associated with the second PDSCH 212 is preconfigured and provided to the UE 202 via radio resource control (RRC) signaling from the BS 204.

Figure 2B:
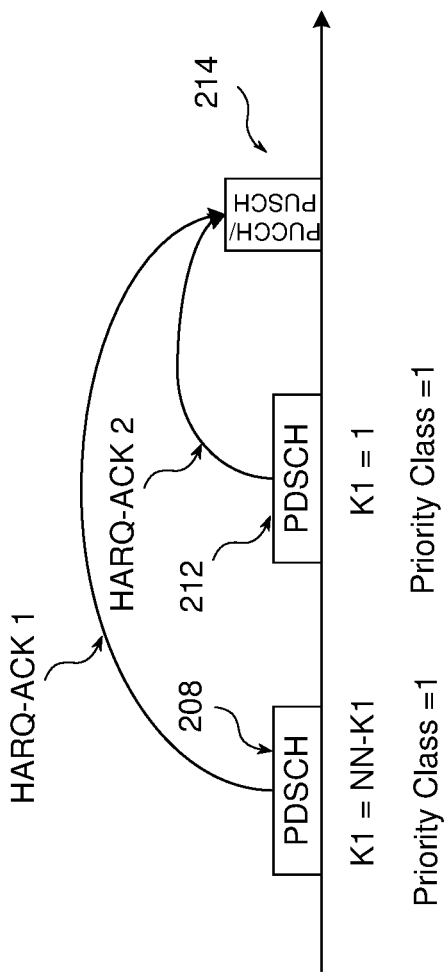
FIG. 2b and FIG. 2c illustrates HARQ-ACK feedback timing determination, when two HARQ-ACK codebooks with different priority classes are configured for a UE, according to one embodiment of the disclosure.

In one example embodiment, as illustrated in FIG. 2b, it is assumed that the second DCI 210 includes a numerical value of K1 for HARQ-ACK feedback. Therefore, the UE 202 is configured to provide the second HARQ-ACK feedback information associated with the second PDSCH 212 using a second PUCCH/PUSCH occasion 214 associated with the second PDSCH 212. In some embodiments, the second PUCCH/PUSCH occasion 214 associated with the second PDSCH 212 is determined based on the numerical value of K1 indicated within the second DCI 210. Further, it is assumed that the priority class of the second PDSCH 212 comprises a same priority class as the first priority class of the first PDSCH 208, as illustrated in FIG. 2b. Therefore, the UE 202 is further configured to provide the first HARQ-ACK feedback associated with the first PDSCH 208 on the second PUCCH/PUSCH occasion 214, as illustrated in FIG. 2b. As can be seen in FIG. 2b, the first PDSCH 208 and the second PDSCH 212 has a priority class 1 (i.e., the same priority class). Further, the second PDSCH 212 has a numerical value of K1. Therefore, the first HARQ-ACK feedback associated with the first PDSCH 208 is multiplexed with the second HARQ-ACK feedback associated with the PDSCH 212 on the second PUCCH/PUSCH occasion 214.

However, in other embodiments, if the second PDSCH 212 has a NN-K1 value for HARQ-ACK feedback or the second PDSCH 212 has a priority class that is different from the first priority class associated with the first PDSCH 208, or both, the UE 202 is configured to hold on to the first HARQ-ACK information associated with the first PDSCH 208, until a subsequent PDSCH having a numerical K1 value and a priority class same as the first priority class associated with the first PDSCH 208 is identified. Specifically, in FIG. 2c, it is assumed that the second PDSCH 212 has a priority class that is different from the first priority class associated with the first PDSCH 208. Referring back to FIG. 2a, in such embodiments, the BS 204 is further configured to provide the third DCI 216 for scheduling a third PDSCH 218. Further, the BS 204 is configured to provide the third PDSCH 218. The UE 202 is configured to receive and process the third DCI 216 and the third PDSCH 218. Upon processing the third DCI 216, the UE 202 is configured to determine whether a numerical K1 value or NN-K1 value is included in a PDSCH-to-HARQ_feedback timing indicator field within the third DCI 216. Further, the UE 202 is configured to generate a third HARQ-ACK information associated with the third PDSCH 218. In addition, the UE 202 is configured to determine a priority class associated with the third PDSCH 218. In some embodiments, the priority class associated with the third PDSCH 218 is indicated to the UE 202 as part of the third DCI 216. Alternately, in other embodiments, the priority class associated with the third PDSCH 218 is preconfigured and provided to the UE 202 via radio resource control (RRC) signaling from the BS 204.

If it is determined that the third DCI 216 includes a numerical value of K1 for HARQ-ACK feedback, the UE 202 is configured to provide the third HARQ-ACK feedback information associated with the third PDSCH 218 using a third PUCCH/PUSCH occasion 220 associated with the third PDSCH 218. In some embodiments, the third PUCCH/PUSCH occasion 220 associated with the third PDSCH 218 is determined based on the numerical value of K1 indicated within the third DCI 216. Further, if it is determined that the priority class of the third PDSCH 218 comprises a same priority class as the first priority class of the first PDSCH 208, the UE 202 is further configured to provide the first HARQ-ACK feedback associated with the first PDSCH 208 on the third PUCCH/PUSCH occasion 220, as illustrated in FIG. 2b. In such embodiments, the first HARQ-ACK feedback associated with the first PDSCH 208 and the third HARQ-ACK feedback associated with the third PDSCH 218 are multiplexed on the third PUCCH/PUSCH occasion 220. Specifically, in FIG. 2b, the first PDSCH 208 and the third PDSCH 218 has a priority class 1 (i.e., the same priority class). Further, the third PDSCH 218 has a numerical value of K1. Therefore, the first HARQ-ACK feedback associated with the first PDSCH 208 is multiplexed with the third HARQ-ACK feedback associated with the third PDSCH 218 on the third PUCCH/PUSCH occasion 220.

Figure 3:
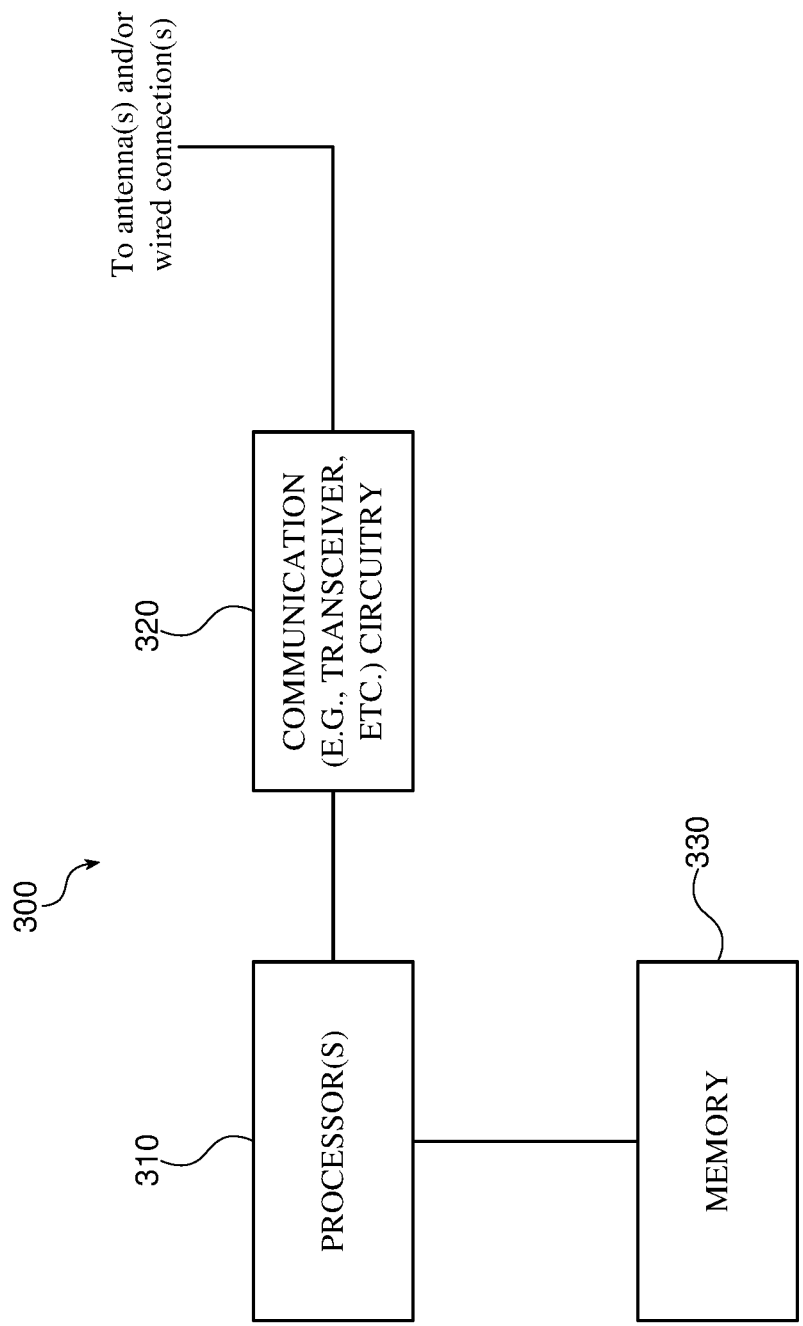
FIG. 3 illustrates a block diagram of an apparatus employable at a Base Station (BS), eNodeB, gNodeB or other network device, according to various aspects described herein.

Referring to FIG. 3, illustrated is a block diagram of an apparatus 300 employable at a Base Station (BS), eNodeB, gNodeB or other network device, according to various aspects described herein. In some embodiments, the apparatus 300 may be included within the base station 204 in the above embodiments. However, in other embodiments, the apparatus 300 could be included within any base station associated with a wireless communication system. The apparatus 300 can include one or more processors (e.g., one or more baseband processors such as one or more of the baseband processors discussed in connection with FIG. 8 and/or FIG. 9) comprising processing circuitry 310 and associated interface(s) (e.g., one or more interface(s) discussed in connection with FIG. 9), transceiver circuitry 320 (e.g., which can comprise circuitry for one or more wired connections and/or part or all of RF circuitry 806, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 330 (which can comprise any of a variety of storage mediums and can store instructions and/or data associated with one or more of processor(s) 310 or transceiver circuitry 320).

In particular, the term memory is intended to include an installation medium, e. g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 300 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 310, transceiver circuitry 320, and the memory 330 can be included in a single device, while in other aspects, they can be included in different devices, such as part of a distributed architecture. In some embodiments, the one or more processors 310, the transceiver circuitry 320 and the memory circuit 330 may be implemented as part of a modem system on a single integrated circuit (IC). Alternately, in other embodiments, the one or more processors 310, the transceiver circuitry 320 and the memory circuit 330 may be implemented on different ICs.

Figure 4:
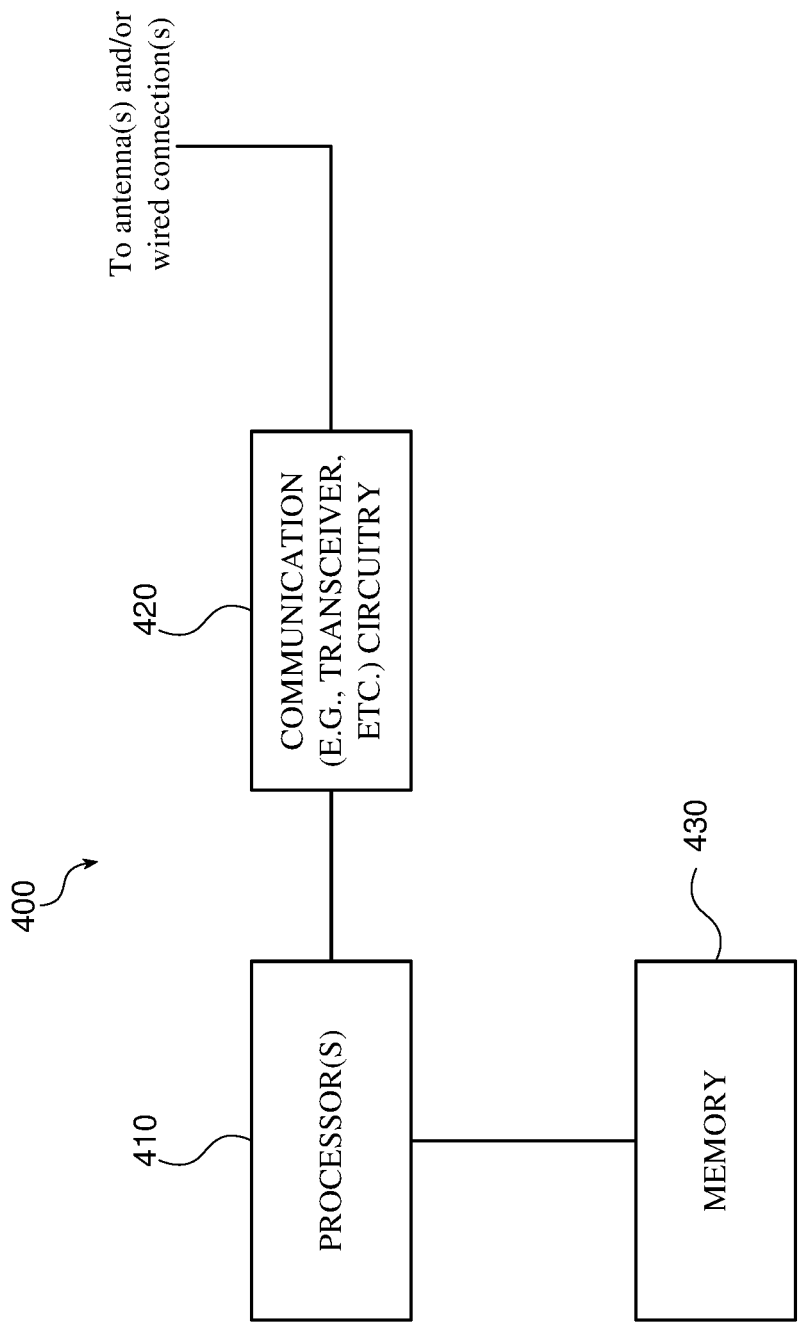
FIG. 4 illustrates a block diagram of an apparatus employable at a user equipment (UE) or other network device (e.g., IoT device), according to various aspects described herein.

Referring to FIG. 4, illustrated is a block diagram of an apparatus 400 employable at a user equipment (UE) or other network device (e.g., IoT device), according to various aspects described herein. In some embodiments, the apparatus 400 may be included within the UE 202 in the above embodiments. However, in other embodiments, the apparatus 400 could be included within any UE associated with a wireless communication system. Apparatus 400 can include one or more processors 410 (e.g., one or more baseband processors such as one or more of the baseband processors discussed in connection with FIG. 8 and/or FIG. 9) comprising processing circuitry and associated interface(s) (e.g., one or more interface(s) discussed in connection with FIG. 9), transceiver circuitry 420 (e.g., comprising part or all of RF circuitry 806, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In particular, the term memory is intended to include an installation medium, e. g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 1000 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 410) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410) can comprise one or more of: identifying physical resources associated with the signal/message, detecting the signal/message, resource element group deinterleaving, demodulation, descrambling, and/or decoding. In some embodiments, the one or more processors 410, the transceiver circuitry 420 and the memory circuit 430 may be implemented as part of a modem system on a single integrated circuit (IC). Alternately, in other embodiments, the one or more processors 410, the transceiver circuitry 420 and the memory circuit 430 may be implemented on different ICs.

Figure 5:
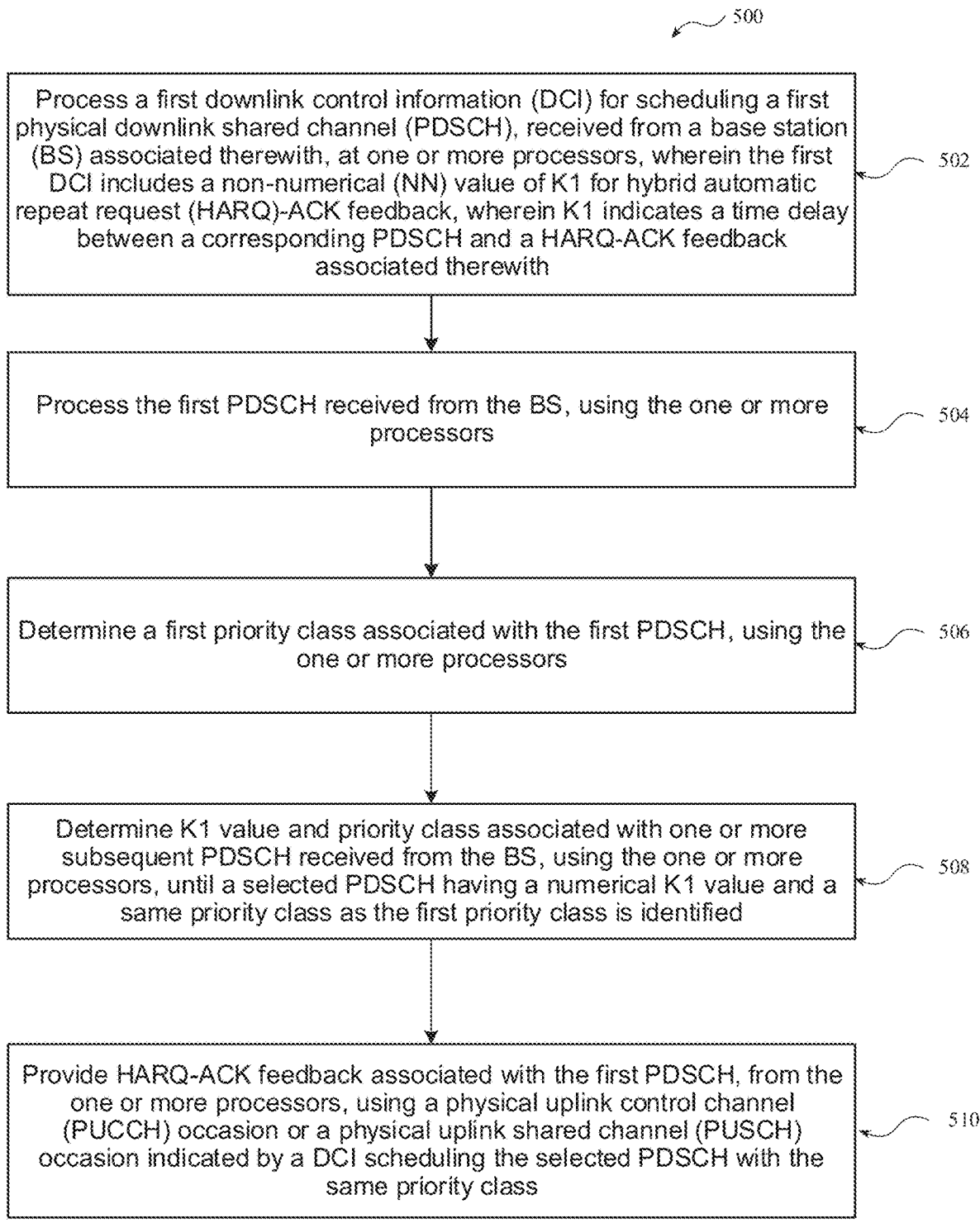
FIG. 5 illustrates a flowchart of a method for a UE associated with a wireless communication system, when the UE is configured with two HARQ-ACK codebooks with different priority class, according to one embodiment of the disclosure.

FIG. 5 illustrates a flowchart of a method 500 for a UE associated with a wireless communication system, when the UE is configured with two HARQ-ACK codebooks with different priority class, according to one embodiment of the disclosure. The method 500 is explained herein with reference to the apparatus 400 in FIG. 4. In some embodiments, the apparatus 400 could be included within the UE 202 in FIG. 2a. Therefore, the method 500 is further explained with reference to the wireless communication system 200 in FIG. 2a. At 502, a first downlink control information (DCI) (e.g., the first DCI 206 in FIG. 2a) for scheduling a first physical downlink shared channel, PDSCH (for example, the first PDSCH 208 in FIG. 2a) having a first priority class associated therewith, received from a base station (e.g., the BS 204 in FIG. 2a) is processed using the one or more processors 410. In some embodiments, the first DCI includes a non-numerical (NN) value of K1 for hybrid automatic repeat request (HARQ)-ACK feedback. In some embodiments, K1 indicates a time delay between a corresponding PDSCH and a HARQ-ACK feedback associated therewith.

Figure 2C:
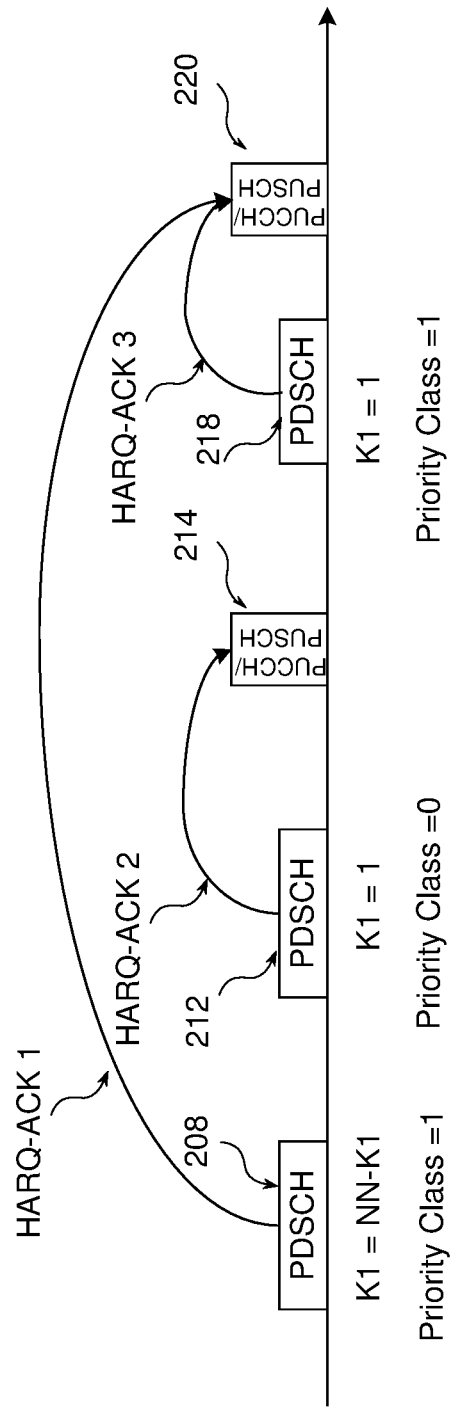

At 504, a first PDSCH (e.g., the first PDSCH 208 in FIG. 2a) received from the BS, is processed using the one or more processors 410. At 506, a first priority class associated with the first PDSCH, is determined using the one or more processors 410. At 508, K1 value and priority class associated with one or more subsequent PDSCH (e.g., the second PDSCH 212 and the third PDSCH 218 in FIG. 2a) received from the BS, is determined using the one or more processors 410, until a selected PDSCH (e.g., the PDSCH 212 as illustrated in FIG. 2b or the third PDSCH 218 as illustrated in FIG. 2c) having a numerical K1 value and a same priority class as the first priority class is identified. At 510, HARQ-ACK feedback associated with the first PDSCH, is provided to the base station from the one or more processors 410, using a physical uplink control channel (PUCCH) occasion or a physical uplink shared channel (PUSCH) occasion (e.g., the PUCCH/PUSCH 214 as illustrated in FIG. 2b or the PUCCH/PUSCH 220 as illustrated in FIG. 2c) indicated by a DCI scheduling the selected PDSCH with the same priority class.

Figure 6:
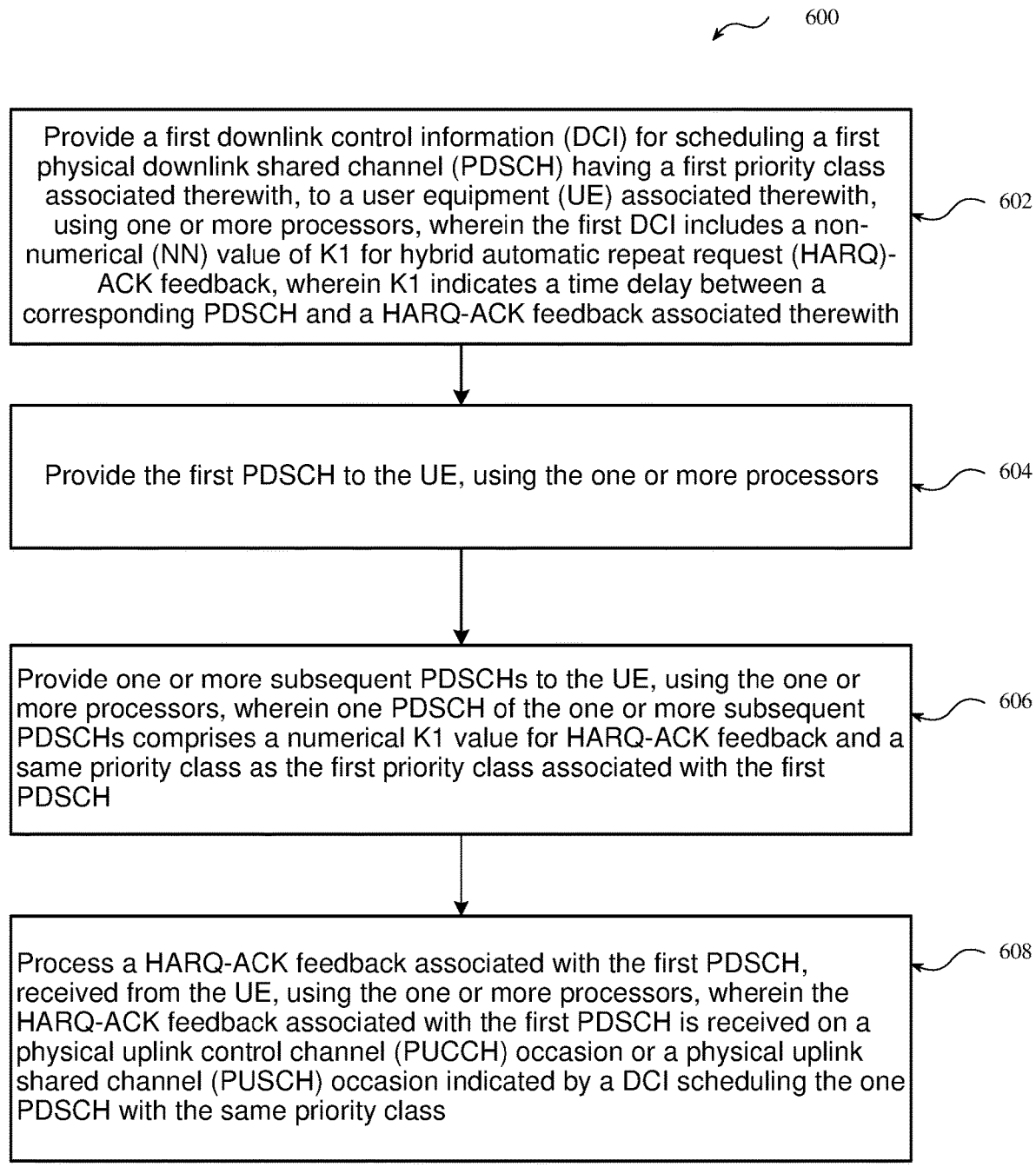
FIG. 6 illustrates a flowchart of a method for a base station (BS) associated with a wireless communication system, when an associated UE is configured with two HARQ-ACK codebooks with different priority class, according to one embodiment of the disclosure.

FIG. 6 illustrates a flowchart of a method 600 for a base station (BS) associated with a wireless communication system, when an associated UE is configured with two HARQ-ACK codebooks with different priority class, according to one embodiment of the disclosure. The method 600 is explained herein with reference to the apparatus 300 in FIG. 3. In some embodiments, the apparatus 300 could be included within the BS 204 in FIG. 2a. Therefore, the method 600 is further explained with reference to the wireless communication system 200 in FIG. 2a. At 602, a first downlink control information (DCI) (e.g., the first DCI 206 in FIG. 2a) for scheduling a first physical downlink shared channel (PDSCH) (e.g., the first PDSCH 208 in FIG. 2a) having a first priority class associated therewith, is provided to a user equipment (UE) (e.g., the UE 202 in FIG. 2a) associated therewith, using the one or more processors 310. In some embodiments, the first DCI includes a non-numerical (NN) value of K1 for hybrid automatic repeat request (HARQ)-ACK feedback. In some embodiments, K1 indicates a time delay between a corresponding PDSCH and a HARQ-ACK feedback associated therewith.

At 604, the first PDSCH is provided to the UE, using the one or more processors 310. At 606, one or more subsequent PDSCHs (e.g., the second PDSCH 212 and the third PDSCH 218 in FIG. 2a) is provided to the UE, using the one or more processors 310. In some embodiments, one PDSCH (e.g., the PDSCH 212 as illustrated in FIG. 2b or the third PDSCH 218 as illustrated in FIG. 2c) of the one or more subsequent PDSCHs comprises a numerical K1 value for HARQ-ACK feedback and a same priority class as the first priority class associated with the first PDSCH. At 608, a HARQ-ACK feedback associated with the first PDSCH, received from the UE, is processed using the one or more processors 310. In some embodiments, the HARQ-ACK feedback associated with the first PDSCH is received on a physical uplink control channel (PUCCH) occasion or a physical uplink shared channel (PUSCH) occasion (e.g., the PUCCH/PUSCH 214 as illustrated in FIG. 2b or the PUCCH/PUSCH 220 as illustrated in FIG. 2c) indicated by a DCI scheduling the one PDSCH with the same priority class.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 7:
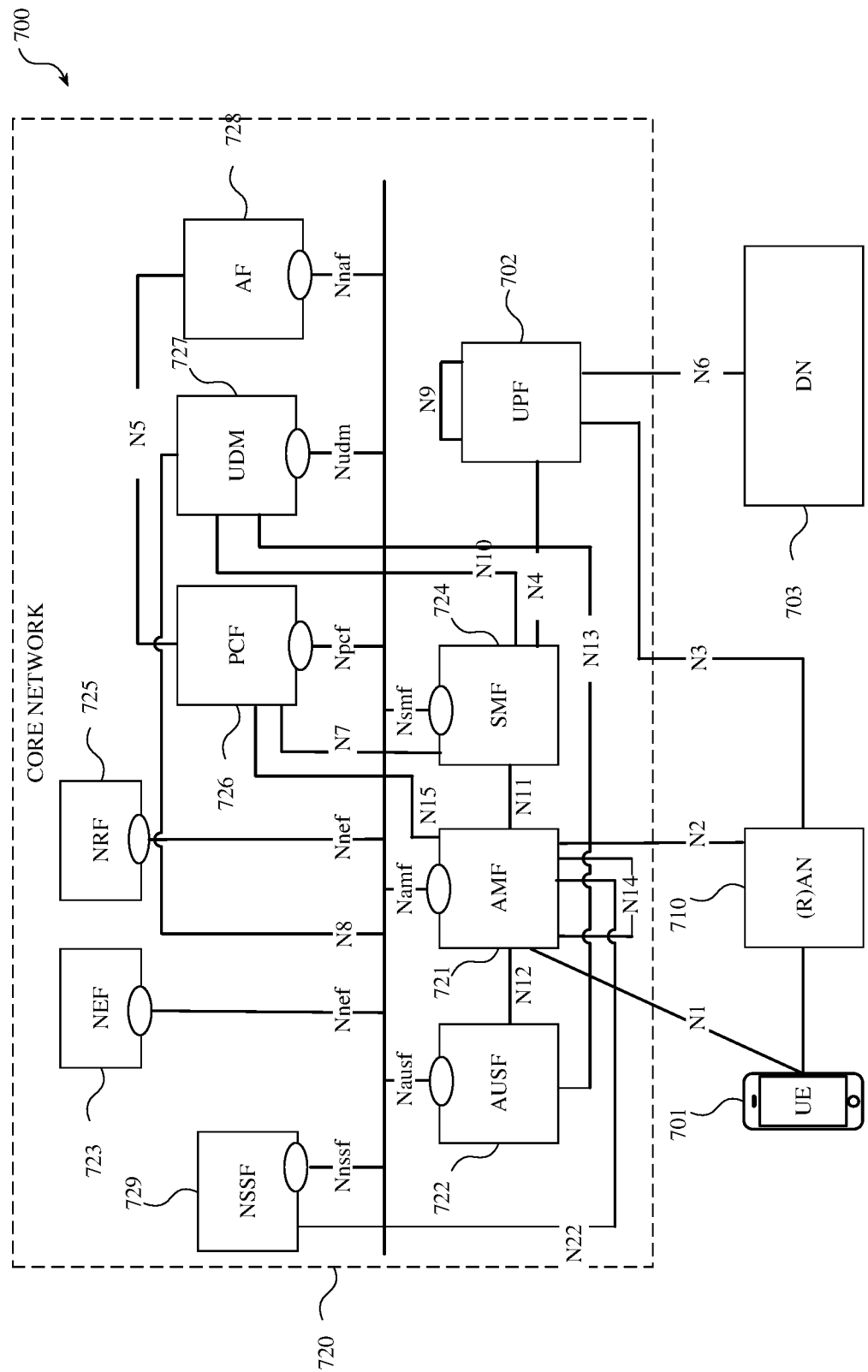
FIG. 7 illustrates an architecture of a system including a Core Network (CN), for example a Fifth Generation (5G) CN (5GC), in accordance with various embodiments.

Embodiments described herein can be implemented into a system using any suitably configured hardware and/or software. FIG. 7 illustrates an architecture of a system 700 including a Core Network (CN) 720, for example a Fifth Generation (5G) CN (5GC), in accordance with various embodiments. The system 700 is shown to include a UE 701, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 720. The 5GC 720 can comprise one or more of the following functions and network components: an Authentication Server Function (AUSF) 722; an Access and Mobility Management Function (AMF) 721; a Session Management Function (SMF) 724; a Network Exposure Function (NEF) 723; a Policy Control Function (PCF) 726; a Network Repository Function (NRF) 725; a Unified Data Management (UDM) 727; an Application Function (AF) 728; a User Plane (UP) Function (UPF) 702; and a Network Slice Selection Function (NSSF) 729.

The UPF 702 can act as an anchor point for intra-RAT and inter-RAT mobility, an external Protocol Data Unit (PDU) session point of interconnect to DN 703, and a branching point to support multi-homed PDU session. The UPF 702 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 702 can include an uplink classifier to support routing traffic flows to a data network. The DN 703 can represent various network operator services, Internet access, or third-party services. DN 703 can include, or be similar to, an application server. The UPF 702 can interact with the SMF 724 via an N4 reference point between the SMF 724 and the UPF 702.

The AUSF 722 can store data for authentication of UE 701 and handle authentication-related functionality. The AUSF 722 can facilitate a common authentication framework for various access types. The AUSF 722 can communicate with the AMF 721 via an N12 reference point between the AMF 721 and the AUSF 722; and can communicate with the UDM 727 via an N13 reference point between the UDM 727 and the AUSF 722. Additionally, the AUSF 722 can exhibit an Nausf service-based interface.

The AMF 721 can be responsible for registration management (e.g., for registering UE 701, etc.), connection management, reachability management, mobility management, and lawful interception of AMF-related events, and access authentication and authorization. The AMF 721 can be a termination point for the an N11 reference point between the AMF 721 and the SMF 724. The AMF 721 can provide transport for SM messages between the UE 701 and the SMF 724, and act as a transparent proxy for routing SM messages. AMF 721 can also provide transport for SMS messages between UE 701 and a Short Message Service (SMS) Function (SMSF) (not shown in FIG. 7). AMF 721 can act as SEcurity Anchor Function (SEAF), which can include interaction with the AUSF 722 and the UE 701 and/or receipt of an intermediate key that was established as a result of the UE 701 authentication process. Where Universal Subscriber Identity Module (USIM) based authentication is used, the AMF 721 can retrieve the security material from the AUSF 722. AMF 721 can also include a Single-Connection Mode (SCM) function, which receives a key from the SEA that it uses to derive access-network specific keys. Furthermore, AMF 721 can be a termination point of a RAN Control Plane (CP) interface, which can include or be an N2 reference point between the (R)AN 710 and the AMF 721; and the AMF 721 can be a termination point of Non Access Stratum (NAS) (N1) signaling, and perform NAS ciphering and integrity protection.

AMF 721 can also support NAS signaling with a UE 701 over an Non-3GPP (N3) Inter Working Function (IWF) interface. The N3IWF can be used to provide access to untrusted entities. N3IWF can be a termination point for the N2 interface between the (R)AN 710 and the AMF 721 for the control plane, and can be a termination point for the N3 reference point between the (R)AN 710 and the UPF 702 for the user plane. As such, the AMF 721 can handle N2 signaling from the SMF 724 and the AMF 721 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 can exhibit an Namf service-based interface, and can be a termination point for an N14 reference point between two AMFs 721 and an N17 reference point between the AMF 721 and a 5G Equipment Identity Register (5G-EIR) (not shown in FIG. 7).

The UE 701 can be registered with the AMF 721 in order to receive network services. Registration Management (RM) is used to register or deregister the UE 701 with the network (e.g., AMF 721), and establish a UE context in the network (e.g., AMF 721). The UE 701 can operate in an RM-REGISTERED state or an RM-DEREGISTERED state. In the RM-DEREGISTERED state, the UE 701 is not registered with the network, and the UE context in AMF 721 holds no valid location or routing information for the UE 701 so the UE 701 is not reachable by the AMF 721. In the RM-REGISTERED state, the UE 701 is registered with the network, and the UE context in AMF 721 can hold a valid location or routing information for the UE 701 so the UE 701 is reachable by the AMF 721. In the RM-REGISTERED state, the UE 701 can perform mobility Registration Update procedures, perform periodic Registration Update procedures triggered by expiration of the periodic update timer (e.g., to notify the network that the UE 701 is still active), and perform a Registration Update procedure to update UE capability information or to re-negotiate protocol parameters with the network, among others.

The AMF 721 can store one or more RM contexts for the UE 701, where each RM context is associated with a specific access to the network. The RM context can be a data structure, database object, etc. that indicates or stores, inter alia, a registration state per access type and the periodic update timer. The AMF 721 can also store a 5GC Mobility Management (MM) context that can be the same or similar to an (Enhanced Packet System (EPS))MM ((E)MM) context. In various embodiments, the AMF 721 can store a Coverage Enhancement (CE) mode B Restriction parameter of the UE 701 in an associated MM context or RM context. The AMF 721 can also derive the value, when needed, from the UE's usage setting parameter already stored in the UE context (and/or MM/RM context).

Connection Management (CM) can be used to establish and release a signaling connection between the UE 701 and the AMF 721 over the N1 interface. The signaling connection is used to enable NAS signaling exchange between the UE 701 and the CN 720, and comprises both the signaling connection between the UE and the AN (e.g., RRC connection or UE-N3IWF connection for non-3GPP access) and the N2 connection for the UE 701 between the AN (e.g., RAN 710) and the AMF 721. The UE 701 can operate in one of two CM states, CM-IDLE mode or CM-CONNECTED mode. When the UE 701 is operating in the CM-IDLE state/mode, the UE 701 may have no NAS signaling connection established with the AMF 721 over the N1 interface, and there can be (R)AN 710 signaling connection (e.g., N2 and/or N3 connections) for the UE 701. When the UE 701 is operating in the CM-CONNECTED state/mode, the UE 701 can have an established NAS signaling connection with the AMF 721 over the N1 interface, and there can be a (R)AN 710 signaling connection (e.g., N2 and/or N3 connections) for the UE 701. Establishment of an N2 connection between the (R)AN 710 and the AMF 721 can cause the UE 701 to transition from CM-IDLE mode to CM-CONNECTED mode, and the UE 701 can transition from the CM-CONNECTED mode to the CM-IDLE mode when N2 signaling between the (R)AN 710 and the AMF 721 is released.

The SMF 724 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 701 and a data network (DN) 703 identified by a Data Network Name (DNN). PDU sessions can be established upon UE 701 request, modified upon UE 701 and 5GC 720 request, and released upon UE 701 and 5GC 720 request using NAS SM signaling exchanged over the N1 reference point between the UE 701 and the SMF 724. Upon request from an application server, the 5GC 720 can trigger a specific application in the UE 701. In response to receipt of the trigger message, the UE 701 can pass the trigger message (or relevant parts/information of the trigger message) to one or more identified applications in the UE 701. The identified application(s) in the UE 701 can establish a PDU session to a specific DNN. The SMF 724 can check whether the UE 701 requests are compliant with user subscription information associated with the UE 701. In this regard, the SMF 724 can retrieve and/or request to receive update notifications on SMF 724 level subscription data from the UDM 727.

The SMF 724 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 724 can be included in the system 700, which can be between another SMF 724 in a visited network and the SMF 724 in the home network in roaming scenarios. Additionally, the SMF 724 can exhibit the Nsmf service-based interface.

The NEF 723 can provide means for securely exposing the services and capabilities provided by 3GPP network functions for third party, internal exposure/re-exposure, Application Functions (e.g., AF 728), edge computing or fog computing systems, etc. In such embodiments, the NEF 723 can authenticate, authorize, and/or throttle the AFs. NEF 723 can also translate information exchanged with the AF 728 and information exchanged with internal network functions. For example, the NEF 723 can translate between an AF-Service-Identifier and an internal 5GC information. NEF 723 can also receive information from other network functions (NFs) based on exposed capabilities of other network functions. This information can be stored at the NEF 723 as structured data, or at a data storage NF using standardized interfaces. The stored information can then be re-exposed by the NEF 723 to other NFs and AFs, and/or used for other purposes such as analytics. Additionally, the NEF 723 can exhibit an Nnef service-based interface.

The NRF 725 can support service discovery functions, receive NF discovery requests from NF instances, and provide the information of the discovered NF instances to the NF instances. NRF 725 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 725 can exhibit the Nnrf service-based interface.

The PCF 726 can provide policy rules to control plane function(s) to enforce them, and can also support unified policy framework to govern network behavior. The PCF 726 can also implement an FE to access subscription information relevant for policy decisions in a UDR of the UDM 727. The PCF 726 can communicate with the AMF 721 via an N15 reference point between the PCF 726 and the AMF 721, which can include a PCF 726 in a visited network and the AMF 721 in case of roaming scenarios. The PCF 726 can communicate with the AF 728 via an N5 reference point between the PCF 726 and the AF 728; and with the SMF 724 via an N7 reference point between the PCF 726 and the SMF 724. The system 700 and/or CN 720 can also include an N24 reference point between the PCF 726 (in the home network) and a PCF 726 in a visited network. Additionally, the PCF 726 can exhibit an Npcf service-based interface.

The UDM 727 can handle subscription-related information to support the network entities' handling of communication sessions, and can store subscription data of UE 701. For example, subscription data can be communicated between the UDM 727 and the AMF 721 via an N8 reference point between the UDM 727 and the AMF. The UDM 727 can include two parts, an application Functional Entity (FE) and a Unified Data Repository (UDR) (the FE and UDR are not shown in FIG. 7). The UDR can store subscription data and policy data for the UDM 727 and the PCF 726, and/or structured data for exposure and application data (including Packet Flow Descriptions (PFDs) for application detection, application request information for multiple UEs 701) for the NEF 723. The Nudr service-based interface can be exhibited by the UDR 221 to allow the UDM 727, PCF 726, and NEF 723 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 724 via an N10 reference point between the UDM 727 and the SMF 724. UDM 727 can also support SMS management, wherein an SMS-FE implements similar application logic as discussed elsewhere herein. Additionally, the UDM 727 can exhibit the Nudm service-based interface.

The AF 728 can provide application influence on traffic routing, provide access to NEF 723, and interact with the policy framework for policy control. 5GC 720 and AF 728 can provide information to each other via NEF 723, which can be used for edge computing implementations. In such implementations, the network operator and third party services can be hosted close to the UE 701 access point of attachment to achieve an efficient service delivery through the reduced end-to-end latency and load on the transport network. For edge computing implementations, the 5GC can select a UPF 702 close to the UE 701 and execute traffic steering from the UPF 702 to DN 703 via the N6 interface. This can be based on the UE subscription data, UE location, and information provided by the AF 728. In this way, the AF 728 can influence UPF (re)selection and traffic routing. Based on operator deployment, when AF 728 is considered to be a trusted entity, the network operator can permit AF 728 to interact directly with relevant NFs. Additionally, the AF 728 can exhibit an Naf service-based interface.

The NSSF 729 can select a set of network slice instances serving the UE 701. The NSSF 729 can also determine allowed Network Slice Selection Assistance Information (NSSAI) and the mapping to the subscribed Single NSSAIs (S-NSSAIs), as appropriate. The NSSF 729 can also determine the AMF set to be used to serve the UE 701, or a list of candidate AMF(s) 721 based on a suitable configuration and possibly by querying the NRF 725. The selection of a set of network slice instances for the UE 701 can be triggered by the AMF 721 with which the UE 701 is registered by interacting with the NSSF 729, which can lead to a change of AMF 721. The NSSF 729 can interact with the AMF 721 via an N22 reference point between AMF 721 and NSSF 729; and can communicate with another NSSF 729 in a visited network via an N31 reference point (not shown in FIG. 7). Additionally, the NSSF 729 can exhibit an Nnssf service-based interface.

As discussed previously, the CN 720 can include an SMSF, which can be responsible for SMS subscription checking and verification, and relaying SM messages to/from the UE 701 to/from other entities, such as an SMS-Gateway Mobile services Switching Center (GMSC)/Inter-Working MSC (IWMSC)/SMS-router. The SMSF can also interact with AMF 721 and UDM 727 for a notification procedure that the UE 701 is available for SMS transfer (e.g., set a UE not reachable flag, and notifying UDM 727 when UE 701 is available for SMS).

The CN 720 can also include other elements that are not shown in FIG. 7, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 7 for clarity. In one example, the CN 720 can include an Nx interface, which is an inter-CN interface between the MME (e.g., a non-5G MME) and the AMF 721 in order to enable interworking between CN 720 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 8:
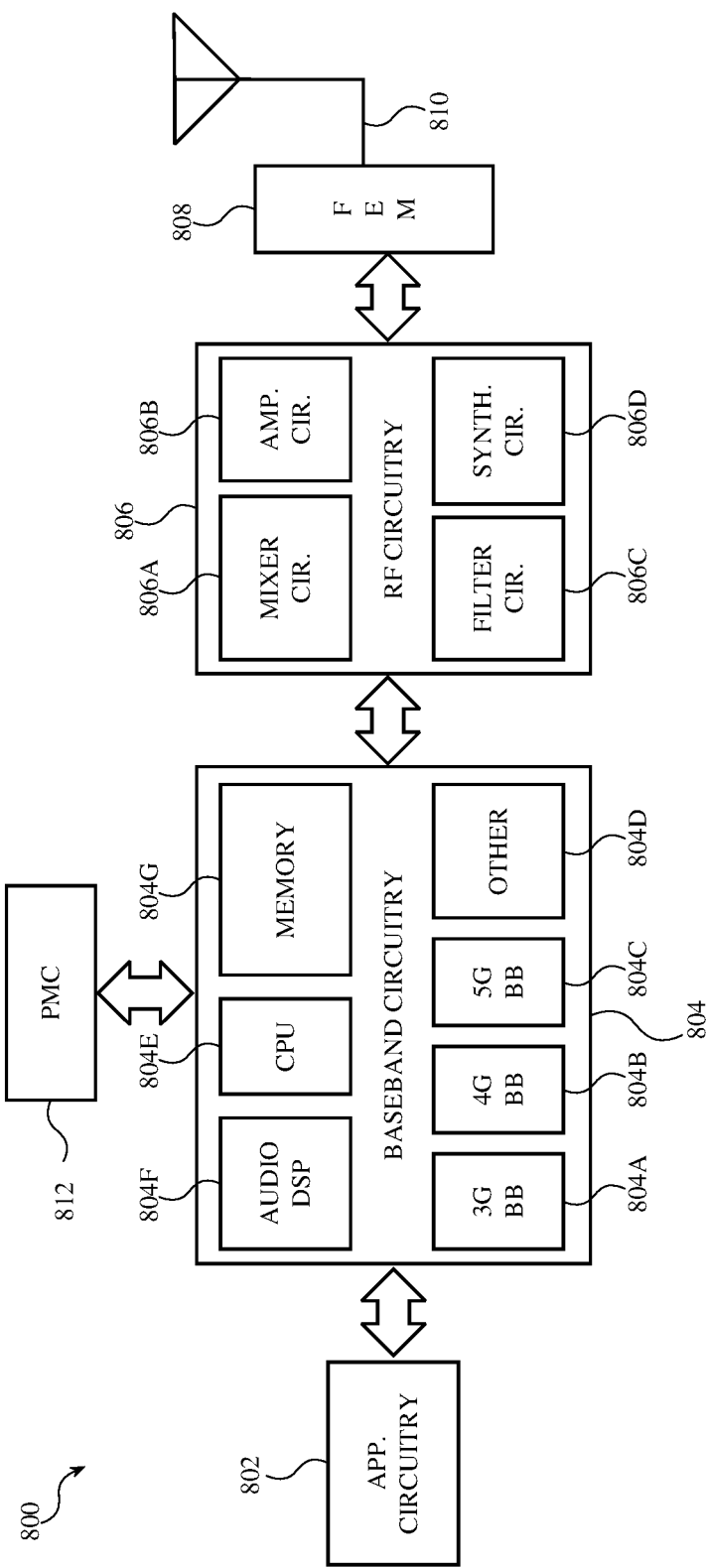
FIG. 8 illustrates example components of a device in accordance with some embodiments.

FIG. 8 illustrates example components of a device 800 in accordance with some embodiments. In some embodiments, the device 800 can include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 can be included in a UE or a RAN node. In some embodiments, the device 800 can include fewer elements (e.g., a RAN node may not utilize application circuitry 802, and instead include a processor/controller to process IP data received from a CN such as 5GC 720 or an Evolved Packet Core (EPC)). In some embodiments, the device 800 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 802 can include one or more application processors. For example, the application circuitry 802 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 800. In some embodiments, processors of application circuitry 802 can process IP data packets received from an EPC.

The baseband circuitry 804 can include circuitry such as, but not limited to, one or more single-core or multi-core processors. The baseband circuitry 804 can include one or more baseband processors or control logic to process baseband signals received from a receive signal path of the RF circuitry 806 and to generate baseband signals for a transmit signal path of the RF circuitry 806. Baseband processing circuitry 804 can interface with the application circuitry 802 for generation and processing of the baseband signals and for controlling operations of the RF circuitry 806. For example, in some embodiments, the baseband circuitry 804 can include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) can handle various radio control functions that enable communication with one or more radio networks via the RF circuitry 806. In other embodiments, some or all of the functionality of baseband processors 804A-D can be included in modules stored in the memory 804G and executed via a Central Processing Unit (CPU) 804E. The radio control functions can include, but are not limited to, signal modulation/demodulation, encoding/decoding, radio frequency shifting, etc. In some embodiments, modulation/demodulation circuitry of the baseband circuitry 804 can include Fast-Fourier Transform (FFT), precoding, or constellation mapping/demapping functionality. In some embodiments, encoding/decoding circuitry of the baseband circuitry 804 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 804 can include one or more audio digital signal processor(s) (DSP) 804F. The audio DSP(s) 804F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 804 and the application circuitry 802 can be implemented together such as, for example, on a system on a chip (SOC).

In some embodiments, the baseband circuitry 804 can provide for communication compatible with one or more radio technologies. For example, in some embodiments, the baseband circuitry 804 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 804 is configured to support radio communications of more than one wireless protocol can be referred to as multi-mode baseband circuitry.

RF circuitry 806 can enable communication with wireless networks using modulated electromagnetic radiation through a non-solid medium. In various embodiments, the RF circuitry 806 can include switches, filters, amplifiers, etc. to facilitate the communication with the wireless network. RF circuitry 806 can include a receive signal path which can include circuitry to down-convert RF signals received from the FEM circuitry 808 and provide baseband signals to the baseband circuitry 804. RF circuitry 806 can also include a transmit signal path which can include circuitry to up-convert baseband signals provided by the baseband circuitry 804 and provide RF output signals to the FEM circuitry 808 for transmission.

In some embodiments, the receive signal path of the RF circuitry 806 can include mixer circuitry 806a, amplifier circuitry 806b and filter circuitry 806c. In some embodiments, the transmit signal path of the RF circuitry 806 can include filter circuitry 806c and mixer circuitry 806a. RF circuitry 806 can also include synthesizer circuitry 806d for synthesizing a frequency for use by the mixer circuitry 806a of the receive signal path and the transmit signal path. In some embodiments, the mixer circuitry 806a of the receive signal path can be configured to down-convert RF signals received from the FEM circuitry 808 based on the synthesized frequency provided by synthesizer circuitry 806d. The amplifier circuitry 806b can be configured to amplify the down-converted signals and the filter circuitry 806c can be a low-pass filter (LPF) or band-pass filter (BPF) configured to remove unwanted signals from the down-converted signals to generate output baseband signals. Output baseband signals can be provided to the baseband circuitry 804 for further processing. In some embodiments, the output baseband signals can be zero-frequency baseband signals, although this is not a requirement. In some embodiments, mixer circuitry 806a of the receive signal path can comprise passive mixers, although the scope of the embodiments is not limited in this respect.

In some embodiments, the mixer circuitry 806a of the transmit signal path can be configured to up-convert input baseband signals based on the synthesized frequency provided by the synthesizer circuitry 806d to generate RF output signals for the FEM circuitry 808. The baseband signals can be provided by the baseband circuitry 804 and can be filtered by filter circuitry 806c.

In some embodiments, the mixer circuitry 806a of the receive signal path and the mixer circuitry 806a of the transmit signal path can include two or more mixers and can be arranged for quadrature downconversion and upconversion, respectively. In some embodiments, the mixer circuitry 806a of the receive signal path and the mixer circuitry 806a of the transmit signal path can include two or more mixers and can be arranged for image rejection (e.g., Hartley image rejection). In some embodiments, the mixer circuitry 806a of the receive signal path and the mixer circuitry 806a can be arranged for direct downconversion and direct upconversion, respectively. In some embodiments, the mixer circuitry 806a of the receive signal path and the mixer circuitry 806a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 806 can include analog-to-digital converter (ADC) and digital-to-analog converter (DAC) circuitry and the baseband circuitry 804 can include a digital baseband interface to communicate with the RF circuitry 806.

In some dual-mode embodiments, a separate radio IC circuitry can be provided for processing signals for each spectrum, although the scope of the embodiments is not limited in this respect.

In some embodiments, the synthesizer circuitry 806d can be a fractional-N synthesizer or a fractional N/N+1 synthesizer, although the scope of the embodiments is not limited in this respect as other types of frequency synthesizers can be suitable. For example, synthesizer circuitry 806d can be a delta-sigma synthesizer, a frequency multiplier, or a synthesizer comprising a phase-locked loop with a frequency divider.

The synthesizer circuitry 806d can be configured to synthesize an output frequency for use by the mixer circuitry 806a of the RF circuitry 806 based on a frequency input and a divider control input. In some embodiments, the synthesizer circuitry 806d can be a fractional N/N+1 synthesizer.

In some embodiments, frequency input can be provided by a voltage controlled oscillator (VCO), although that is not a requirement. Divider control input can be provided by either the baseband circuitry 804 or the applications processor 802 depending on the desired output frequency. In some embodiments, a divider control input (e.g., N) can be determined from a look-up table based on a channel indicated by the applications processor 802.

Synthesizer circuitry 806d of the RF circuitry 806 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 806 can include an IQ/polar converter.

FEM circuitry 808 can include a receive signal path which can include circuitry configured to operate on RF signals received from one or more antennas 810, amplify the received signals and provide the amplified versions of the received signals to the RF circuitry 806 for further processing. FEM circuitry 808 can also include a transmit signal path which can include circuitry configured to amplify signals for transmission provided by the RF circuitry 806 for transmission by one or more of the one or more antennas 810. In various embodiments, the amplification through the transmit or receive signal paths can be done solely in the RF circuitry 806, solely in the FEM 808, or in both the RF circuitry 806 and the FEM 808.

In some embodiments, the FEM circuitry 808 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 806). The transmit signal path of the FEM circuitry 808 can include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 can manage power provided to the baseband circuitry 804. In particular, the PMC 812 can control power-source selection, voltage scaling, battery charging, or DC-to-DC conversion. The PMC 812 can often be included when the device 800 is capable of being powered by a battery, for example, when the device is included in a UE. The PMC 812 can increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 can control, or otherwise be part of, various power saving mechanisms of the device 800. For example, if the device 800 is in an RRC_Connected state, where it is still connected to the RAN node as it expects to receive traffic shortly, then it can enter a state known as Discontinuous Reception Mode (DRX) after a period of inactivity. During this state, the device 800 can power down for brief intervals of time and thus save power.

If there is no data traffic activity for an extended period of time, then the device 800 can transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 802 and processors of the baseband circuitry 804 can be used to execute elements of one or more instances of a protocol stack. For example, processors of the baseband circuitry 804, alone or in combination, can be used execute Layer 3, Layer 2, or Layer 1 functionality, while processors of the application circuitry 804 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 9:
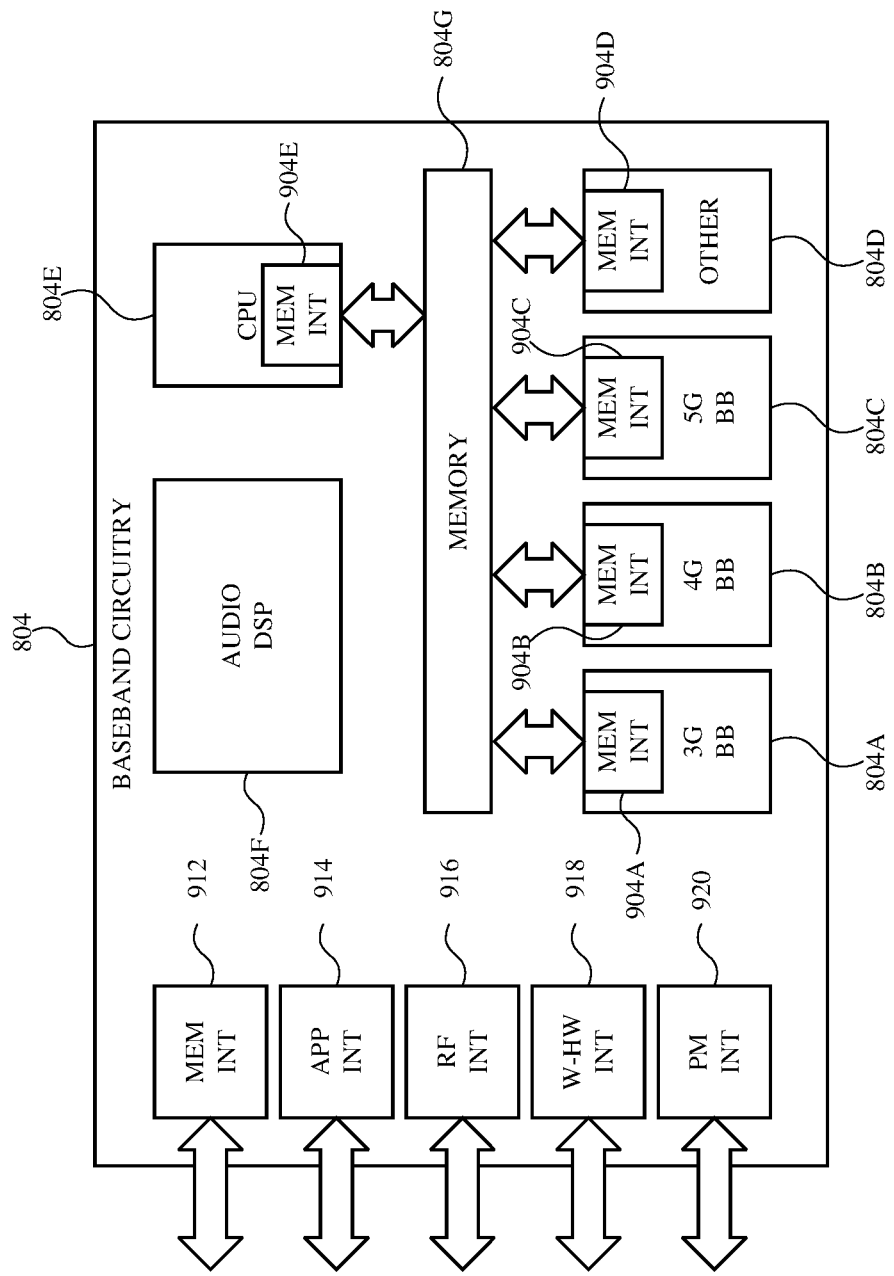
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 2 can comprise processors 804A-804E and a memory 804G utilized by said processors. Each of the processors 804A-804E can include a memory interface, 904A-904E, respectively, to send/receive data to/from the memory 804G.

The baseband circuitry 804 can further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 2), an RF circuitry interface 916 (e.g., an interface to send/receive data to/from RF circuitry 806 of FIG. 2), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812).

In various aspects, embodiments discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a user equipment (UE) device comprising a processor (or processing circuitry) configured to perform operations comprising receiving a first downlink control information (DCI) for scheduling a first physical downlink shared channel (PDSCH), from a base station (BS) associated therewith, wherein the first DCI includes a non-numerical (NN) K1 value for a first hybrid automatic repeat request (HARQ)-ACK feedback associated with the first PDSCH, wherein K1 value indicates a time delay between a PDSCH and a HARQ-ACK feedback associated therewith; receiving the first PDSCH from the BS; determining a first priority class associated with the first PDSCH; determining the K1 value and priority class associated with one or more subsequent PDSCH received from the BS, until a selected PDSCH having a numerical K1 value and a same priority class as the first priority class is identified; and sending the first HARQ-ACK feedback associated with the first PDSCH using a physical uplink control channel (PUCCH) occasion or a physical uplink shared channel (PUSCH) occasion indicated by a second DCI scheduling the selected PDSCH with the same priority class.

Example 2 is a UE device, including the subject matter of example 1, wherein the first DCI further includes information of the first priority class associated with the first PDSCH, and wherein the one or more processors is configured to determine the first priority class based on processing the first DCI.

Example 3 is a UE device, including the subject matter of examples 1-2, including or omitting elements, wherein the first priority class associated with the first PDSCH and the priority class associated with the one or more subsequent PDSCH are preconfigured and received at the UE via radio resource control (RRC) signaling from the BS.

Example 4 is a UE device, including the subject matter of examples 1-3, including or omitting elements, wherein the K1 value associated with the one or more subsequent PDSCH are included as part of one or more subsequent DCI respectively associated with the one or more subsequent PDSCH, and wherein the one or more processors is configured to determine the K1 value associated with the one or more subsequent PDSCH, based on processing the one or more subsequent DCI.

Example 5 is a UE device, including the subject matter of examples 1-4, including or omitting elements, wherein the one or more subsequent DCI further includes information of the priority class associated with the one or more subsequent PDSCH, and wherein the one or more processors is configured to determine the priority class associated with the one or more subsequent PDSCH based on processing the one or more subsequent DCI.

Example 6 is a base station comprising a processor (or processing circuitry) configured to perform operations comprising sending a first downlink control information (DCI) for scheduling a first physical downlink shared channel (PDSCH) having a first priority class associated therewith, to a user equipment (UE) associated therewith, wherein the first DCI includes a non-numerical (NN) K1 value for a first hybrid automatic repeat request (HARQ)-ACK feedback associated with the first PDSCH, wherein K1 value indicates a time delay between a corresponding PDSCH and a HARQ-ACK feedback associated therewith; sending the first PDSCH to the UE; sending one or more subsequent PDSCHs to the UE, wherein one PDSCH of the one or more subsequent PDSCHs comprises a numerical K1 value for a corresponding HARQ-ACK feedback and a same priority class as the first priority class associated with the first PDSCH; and receiving the first HARQ-ACK feedback associated with the first PDSCH from the UE, wherein the first HARQ-ACK feedback associated with the first PDSCH is received on a physical uplink control channel (PUCCH) occasion or a physical uplink shared channel (PUSCH) occasion indicated by a second DCI scheduling the one PDSCH with the same priority class.

Example 7 is a base station, including the subject matter of example 6, wherein the first DCI further includes information of the first priority class associated with the first PDSCH.

Example 8 is a base station, including the subject matter of examples 6-7, including or omitting elements, wherein the one or more processors is configured to provide the first priority class associated with the first PDSCH and priority class associated with the one or more subsequent PDSCH to the UE via radio resource control (RRC) signaling.

Example 9 is a method for a user equipment (UE) associated with a wireless communication system, comprising receiving a first downlink control information (DCI) for scheduling a first physical downlink shared channel (PDSCH), from a base station (BS) associated therewith, using one or more processors, wherein the first DCI includes a non-numerical (NN) K1 value for a first hybrid automatic repeat request (HARQ)-ACK feedback associated with the first PDSCH, wherein K1 value indicates a time delay between a PDSCH and a HARQ-ACK feedback associated therewith; receiving the first PDSCH from the BS, using the one or more processors; determining a first priority class associated with the first PDSCH, using the one or more processors; determining the K1 value and priority class associated with one or more subsequent PDSCH received from the BS, using the one or more processors, until a selected PDSCH having a numerical K1 value and a same priority class as the first priority class is identified; and sending the first HARQ-ACK feedback associated with the first PDSCH, from the one or more processors, using a physical uplink control channel (PUCCH) occasion or a physical uplink shared channel (PUSCH) occasion indicated by a second DCI scheduling the selected PDSCH with the same priority class.

Example 10 is a method, including the subject matter of example 9, wherein the first DCI further includes information of the first priority class associated with the first PDSCH, and wherein the one or more processors is configured to determine the first priority class based on processing the first DCI.

Example 11 is a method, including the subject matter of examples 9-10, including or omitting elements, wherein the first priority class associated with the first PDSCH and the priority class associated with the one or more subsequent PDSCH are preconfigured and received at the UE via radio resource control (RRC) signaling from the BS.

Example 12 is a method, including the subject matter of examples 9-11, including or omitting elements, wherein the K1 value associated with the one or more subsequent PDSCH are included as part of one or more subsequent DCI respectively associated with the one or more subsequent PDSCH, and wherein the one or more processors is configured to determine the K1 value associated with the one or more subsequent PDSCH, based on processing the one or more subsequent DCI.

Example 13 is a method, including the subject matter of examples 9-12, including or omitting elements, wherein the one or more subsequent DCI further includes information of the priority class associated with the one or more subsequent PDSCH, and wherein the one or more processors is configured to determine the priority class associated with the one or more subsequent PDSCH based on processing the one or more subsequent DCI.

Example 14 is a method for a base station (BS) associated with a wireless communication system, comprising sending a first downlink control information (DCI) for scheduling a first physical downlink shared channel (PDSCH) having a first priority class associated therewith, to a user equipment (UE) associated therewith, using one or more processors, wherein the first DCI includes a non-numerical (NN) K1 value for a first hybrid automatic repeat request (HARQ)-ACK feedback associated with the first PDSCH, wherein K1 value indicates a time delay between a PDSCH and a HARQ-ACK feedback associated therewith; sending the first PDSCH to the UE, using the one or more processors; sending one or more subsequent PDSCHs to the UE, using the one or more processors, wherein one PDSCH of the one or more subsequent PDSCHs comprises a numerical K1 value for a corresponding HARQ-ACK feedback and a same priority class as the first priority class associated with the first PDSCH; and receiving the first HARQ-ACK feedback associated with the first PDSCH, from the UE, using the one or more processors, wherein the first HARQ-ACK feedback associated with the first PDSCH is received on a physical uplink control channel (PUCCH) occasion or a physical uplink shared channel (PUSCH) occasion indicated by a second DCI scheduling the one PDSCH with the same priority class.

Example 15 is a method, including the subject matter of example 14, wherein the first DCI further includes information of the first priority class associated with the first PDSCH.

Example 16 is a method, including the subject matter of examples 14-15, including or omitting elements, wherein the first priority class associated with the first PDSCH and priority class associated with the one or more subsequent PDSCH are send to the UE via radio resource control (RRC) signaling.

Example 17 is a baseband (BB) processor for a user equipment (UE) configured to perform operations comprising receiving a first downlink control information (DCI) for scheduling a first physical downlink shared channel (PDSCH), from a base station (BS) associated therewith, wherein the first DCI includes a non-numerical (NN) K1 value for a first hybrid automatic repeat request (HARQ)-ACK feedback associated with the first PDSCH, wherein K1 value indicates a time delay between a PDSCH and a HARQ-ACK feedback associated therewith; receiving the first PDSCH from the BS; determining a first priority class associated with the first PDSCH; determining the K1 value and priority class associated with one or more subsequent PDSCH received from the BS, until a selected PDSCH having a numerical K1 value and a same priority class as the first priority class is identified; and sending the first HARQ-ACK feedback associated with the first PDSCH using a physical uplink control channel (PUCCH) occasion or a physical uplink shared channel (PUSCH) occasion indicated by a second DCI scheduling the selected PDSCH with the same priority class.

Example 18 is a BB processor, including the subject matter of example 17, wherein the first DCI further includes information of the first priority class associated with the first PDSCH, and wherein the one or more processors is configured to determine the first priority class based on processing the first DCI.

Example 19 is a BB processor, including the subject matter of examples 17-18, including or omitting elements, wherein the first priority class associated with the first PDSCH and the priority class associated with the one or more subsequent PDSCH are preconfigured and received at the UE via radio resource control (RRC) signaling from the BS.

Example 20 is a BB processor, including the subject matter of examples 17-19, including or omitting elements, wherein the K1 value associated with the one or more subsequent PDSCH are included as part of one or more subsequent DCI respectively associated with the one or more subsequent PDSCH, and wherein the one or more processors is configured to determine the K1 value associated with the one or more subsequent PDSCH, based on processing the one or more subsequent DCI.

Example 21 is a BB processor, including the subject matter of examples 17-20, including or omitting elements, wherein the one or more subsequent DCI further includes information of the priority class associated with the one or more subsequent PDSCH, and wherein the one or more processors is configured to determine the priority class associated with the one or more subsequent PDSCH based on processing the one or more subsequent DCI.

Example 22 is a baseband (BB) processor for a base station configured to perform operations comprising sending a first downlink control information (DCI) for scheduling a first physical downlink shared channel (PDSCH) having a first priority class associated therewith, to a user equipment (UE) associated therewith, wherein the first DCI includes a non-numerical (NN) K1 value for a first hybrid automatic repeat request (HARQ)-ACK feedback associated with the first PDSCH, wherein K1 value indicates a time delay between a PDSCH and a HARQ-ACK feedback associated therewith; sending the first PDSCH to the UE; sending one or more subsequent PDSCHs to the UE, wherein one PDSCH of the one or more subsequent PDSCHs comprises a numerical K1 value for a corresponding HARQ-ACK feedback and a same priority class as the first priority class associated with the first PDSCH; and receiving the first HARQ-ACK feedback associated with the first PDSCH from the UE, wherein the first HARQ-ACK feedback associated with the first PDSCH is received on a physical uplink control channel (PUCCH) occasion or a physical uplink shared channel (PUSCH) occasion indicated by a second DCI scheduling the one PDSCH with the same priority class.

Example 23 is a BB processor, including the subject matter of example 22, wherein the first DCI further includes information of the first priority class associated with the first PDSCH.

Example 24 is a BB processor, including the subject matter of examples 22-23, including or omitting elements, wherein the one or more processors is configured to provide the first priority class associated with the first PDSCH and priority class associated with the one or more subsequent PDSCH to the UE via radio resource control (RRC) signaling.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. A baseband (BB) processor of a user equipment (UE) configured to perform operations comprising:
    receiving a first downlink control information (DCI) for scheduling a first physical downlink shared channel (PDSCH), from a base station (BS), wherein the first DCI indicates a non-numerical (NN) time delay for a first hybrid automatic repeat request (HARQ)-ACK feedback associated with the first PDSCH;
    receiving the first PDSCH from the BS based on the first DCI;
    determining a first priority class associated with the first PDSCH;
    determining time delay and priority class associated with one or more subsequent PDSCH received from the BS, until a second PDSCH having a numerical time delay for a second HARQ-ACK feedback and a same priority class as the first priority class is identified; and
    providing the first HARQ-ACK feedback for transmission using a physical uplink control channel (PUCCH) occasion or a physical uplink shared channel (PUSCH) occasion indicated by a second DCI scheduling the second PDSCH.

2. The BB processor of claim 1, wherein the first DCI further indicates the first priority class.

3. The BB processor of claim 1, wherein the first priority class and the priority class associated with the one or more subsequent PDSCH are preconfigured and received at the UE via radio resource control (RRC) signaling from the BS.

4. The BB processor of claim 1, wherein the time delay associated with the one or more subsequent PDSCH is included as part of one or more subsequent DCI respectively associated with the one or more subsequent PDSCH, and wherein the operations further comprise determining the time delay associated with the one or more subsequent PDSCH based on processing the one or more subsequent DCI.

5. The BB processor of claim 4, wherein the one or more subsequent DCI further indicates the priority class associated with the one or more subsequent PDSCH, and wherein the operations further comprise determining the priority class associated with the one or more subsequent PDSCH based on processing the one or more subsequent DCI.

6. The BB processor of claim 1, wherein the NN time delay is included in a PDSCH-to-HARQ_feedback timing indicator field associated with the first DCI.

7. The BB processor of claim 1, wherein the NN time delay and the numerical time delay are indicated in slots.

8. The BB processor of claim 1, wherein the second HARQ-ACK feedback associated with the second PDSCH is sent on the PUCCH occasion or the PUSCH occasion indicated by the second DCI.

9. A baseband (BB) processor of a base station (BS) configured to perform operations comprising:
    sending a first downlink control information (DCI) for scheduling a first physical downlink shared channel (PDSCH) having a first priority class to a user equipment (UE), wherein the first DCI includes a non-numerical (NN) time delay for a first hybrid automatic repeat request (HARQ)-ACK feedback associated with the first PDSCH;
    sending the first PDSCH to the UE;
    sending one or more subsequent PDSCHs to the UE, wherein a second PDSCH of the one or more subsequent PDSCHs comprises a numerical time delay for a second HARQ-ACK feedback and a same priority class as the first priority class; and
    receiving the first HARQ-ACK feedback associated with the first PDSCH from the UE, wherein the first HARQ-ACK feedback associated with the first PDSCH is received on a physical uplink control channel (PUCCH) occasion or a physical uplink shared channel (PUSCH) occasion indicated by a second DCI scheduling the second PDSCH.

10. The BB processor of claim 9, wherein the first DCI further includes information of the first priority class.

11. The BB processor of claim 9, wherein the first priority class and priority class associated with the one or more subsequent PDSCH are provided to the UE via radio resource control (RRC) signaling.

12. The BB processor of claim 9, wherein the NN time delay is included in a PDSCH-to-HARQ_feedback timing indicator field associated with the first DCI.

13. The BB processor of claim 9, wherein the NN time delay and the numerical time delay are indicated in slots.

14. The BB processor of claim 9, wherein the second HARQ-ACK feedback associated with the second PDSCH is sent on the PUCCH occasion or the PUSCH occasion indicated by the second DCI.

15. A method to perform operations comprising:
    receiving a first downlink control information (DCI) for scheduling a first physical downlink shared channel (PDSCH), from a base station (BS), wherein the first DCI includes a non-numerical (NN) K1 value for a first hybrid automatic repeat request (HARQ)-ACK feedback associated with the first PDSCH, wherein K1 value indicates a time delay between a PDSCH and a HARQ-ACK feedback associated therewith;
    receiving the first PDSCH from the BS;
    determining a first priority class associated with the first PDSCH;
    determining K1 value and priority class associated with one or more subsequent PDSCH received from the BS, until a selected PDSCH having a numerical K1 value and a same priority class as the first priority class is identified; and
    sending the first HARQ-ACK feedback using a physical uplink control channel (PUCCH) occasion or a physical uplink shared channel (PUSCH) occasion indicated by a second DCI scheduling the selected PDSCH.

16. The method of claim 15, wherein the first DCI further includes information of the first priority class associated with the first PDSCH, and wherein the operations further comprise determining the first priority class based on processing the first DCI.

17. The method of claim 15, wherein the first priority class associated with the first PDSCH and the priority class associated with the one or more subsequent PDSCH are preconfigured and received at the UE via radio resource control (RRC) signaling from the BS.

18. The method of claim 15, wherein the K1 value associated with the one or more subsequent PDSCH are included as part of one or more subsequent DCI respectively associated with the one or more subsequent PDSCH, and wherein the operations further comprise determining the K1 value associated with the one or more subsequent PDSCH, based on processing the one or more subsequent DCI.

19. The method of claim 18, wherein the one or more subsequent DCI further includes information of the priority class associated with the one or more subsequent PDSCH, and wherein the operations further comprise determining the priority class associated with the one or more subsequent PDSCH based on processing the one or more subsequent DCI.

20. The method of claim 15, wherein the operations further comprise sending the second HARQ-ACK feedback on the PUCCH occasion or the PUSCH occasion indicated by the second DCI.

* * * * *